(12) United States Patent
Unnikrishnan et al.

(10) Patent No.: US 10,515,401 B1
(45) Date of Patent: Dec. 24, 2019

(54) UTILIZING MACHINE LEARNING TO GENERATE VEHICLE INFORMATION FOR A VEHICLE CAPTURED BY A USER DEVICE IN A VEHICLE LOT

(71) Applicant: Capital One Services, LLC, McLean, VA (US)

(72) Inventors: Sasi Kumar Unnikrishnan, McLean, VA (US); Venkata Satya Parcha, McLean, VA (US); Satish Chikkaveerappa, McLean, VA (US); Renjith Pascas, McLean, VA (US); Ponnazhakan Subramanian, McLean, VA (US); Lokesh Vijay Kumar, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/279,716

(22) Filed: Feb. 19, 2019

(51) Int. Cl.
| | |
|---|---|
| *G06Q 30/00* | (2012.01) |
| *G06Q 30/06* | (2012.01) |
| *G06Q 30/02* | (2012.01) |
| *G06Q 10/08* | (2012.01) |
| *G06N 20/00* | (2019.01) |
| *G05D 1/02* | (2006.01) |

(52) U.S. Cl.
CPC ....... *G06Q 30/0635* (2013.01); *G05D 1/0225* (2013.01); *G06N 20/00* (2019.01); *G06Q 10/087* (2013.01); *G06Q 30/0205* (2013.01); *G06Q 30/0255* (2013.01); *G06Q 30/0613* (2013.01); *G05D 2201/0213* (2013.01)

(58) Field of Classification Search
CPC ...................................... G06Q 30/00–30/0284
USPC ............................................. 705/14.4–14.73
See application file for complete search history.

(56) References Cited

U.S. PATENT DOCUMENTS

| | | | |
|---|---|---|---|
| 2009/0313121 A1* | 12/2009 | Post ................... | G06Q 30/0255 705/14.53 |
| 2010/0082444 A1 | 4/2010 | Lin et al. | |
| 2012/0101891 A1* | 4/2012 | Collier .............. | G06Q 30/0234 705/14.34 |
| 2013/0211916 A1 | 8/2013 | Putman | |
| 2015/0223012 A1 | 8/2015 | Kakarala et al. | |
| 2016/0019551 A1* | 1/2016 | Garver ................. | H04W 4/029 705/304 |
| 2016/0071149 A1* | 3/2016 | Farshori ............ | G06Q 30/0253 705/14.51 |
| 2016/0189164 A1* | 6/2016 | Tolksdorf ............ | G06Q 30/016 705/304 |

(Continued)

*Primary Examiner* — John Van Bramer
(74) *Attorney, Agent, or Firm* — Harrity & Harrity, LLP

(57) ABSTRACT

A device receives vehicle data associated with vehicles located at a vehicle dealership lot, and receives, from a user device, profile data identifying a user of the user device and data identifying a particular vehicle of the vehicles. The device compares the data identifying the particular vehicle and the vehicle data to determine particular vehicle data associated with the particular vehicle, and processes the particular vehicle data and the profile data of the user, with a first model, to determine purchase options for the particular vehicle and the user. The device provides, to the user device, the particular vehicle data and the purchase options for the particular vehicle to cause the user device to display the particular vehicle data and the purchase options for the particular vehicle.

20 Claims, 13 Drawing Sheets

(56) References Cited

U.S. PATENT DOCUMENTS

2016/0217506 A1    7/2016  Kakarala et al.
2016/0283955 A1*   9/2016  Terrazas ............. G06Q 30/0202
2017/0337573 A1*  11/2017  Toprak ............... G06Q 30/0202
2018/0349975 A1*  12/2018  Lee .................... G06Q 30/0627

* cited by examiner

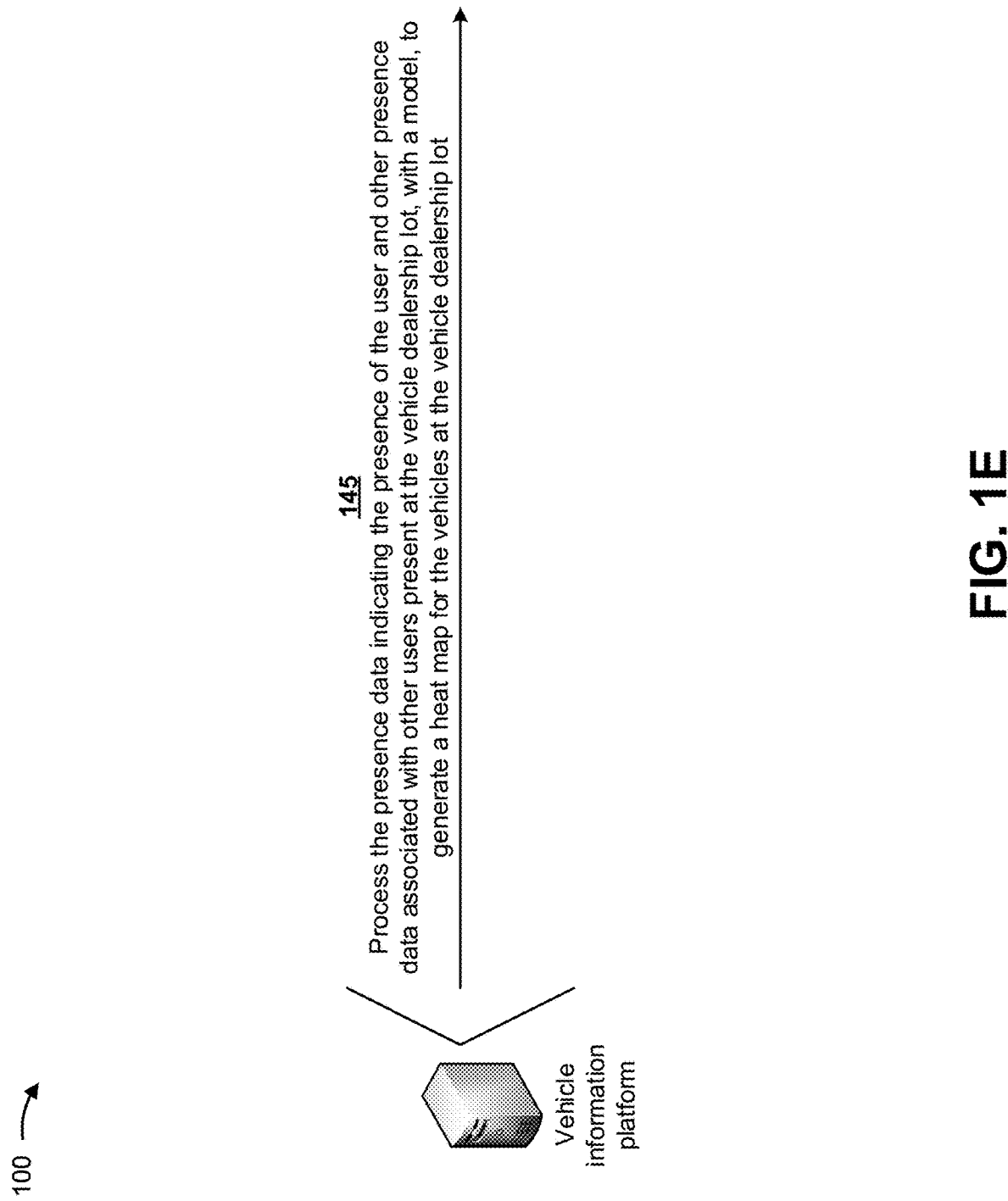

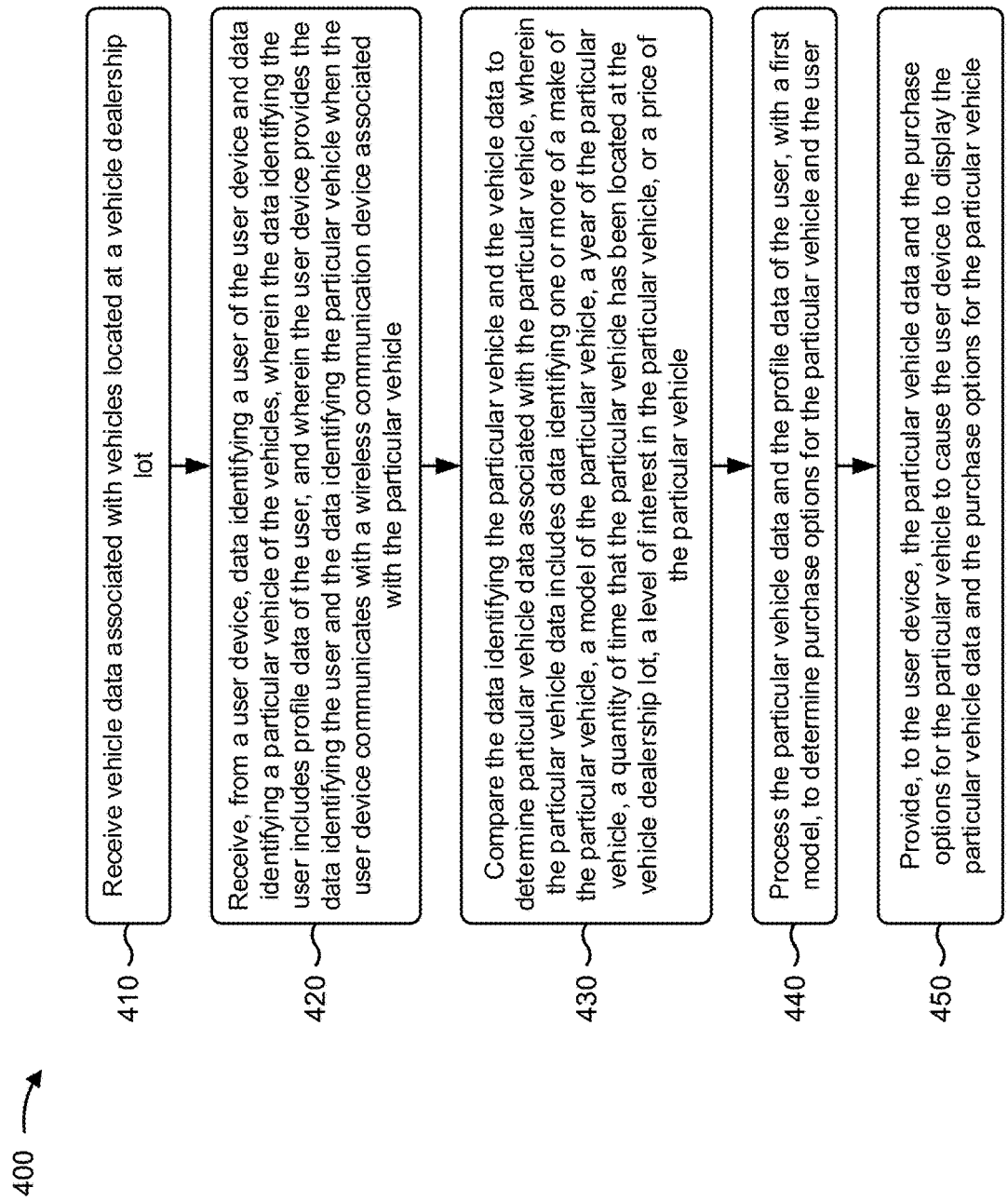

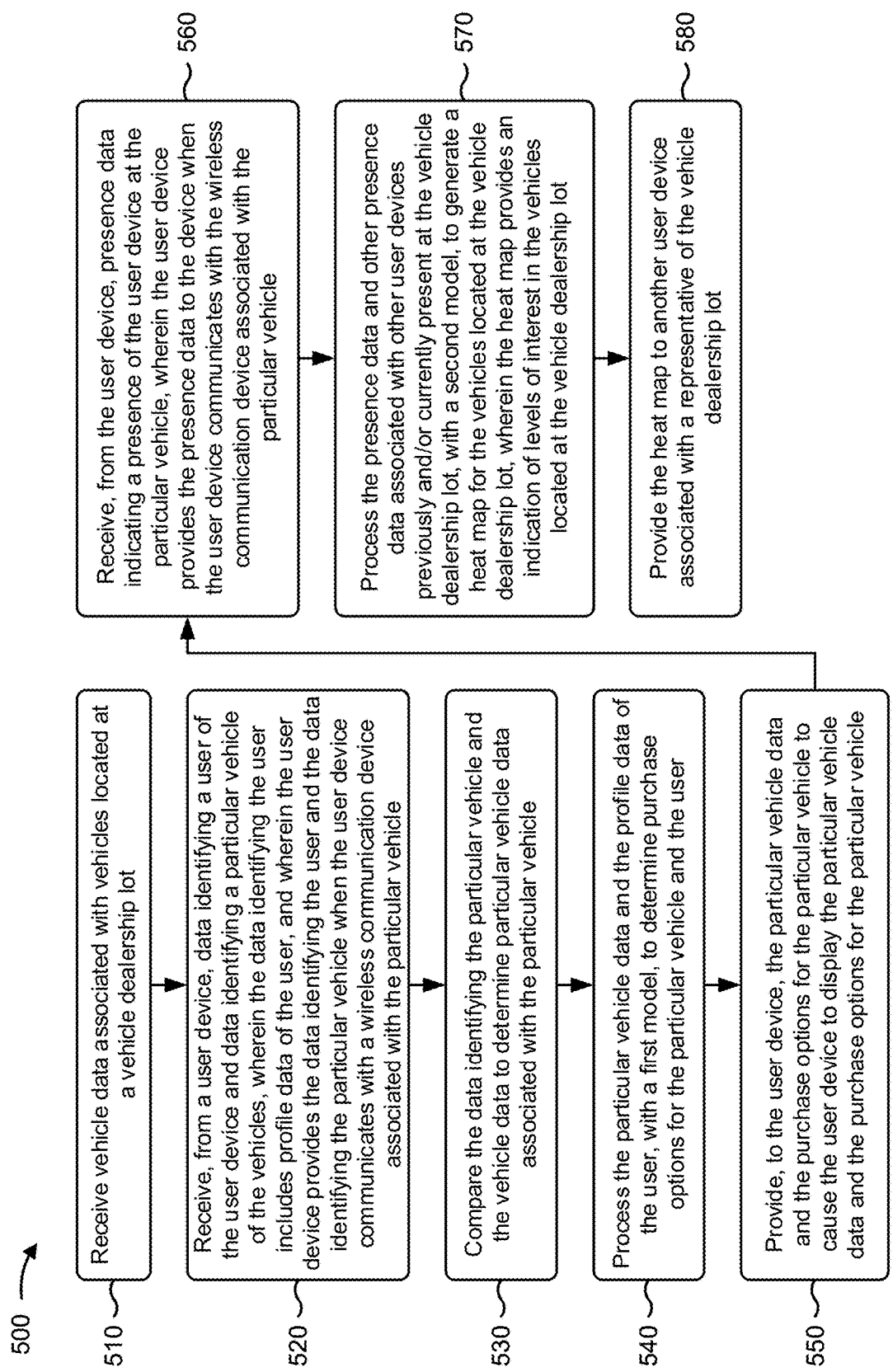

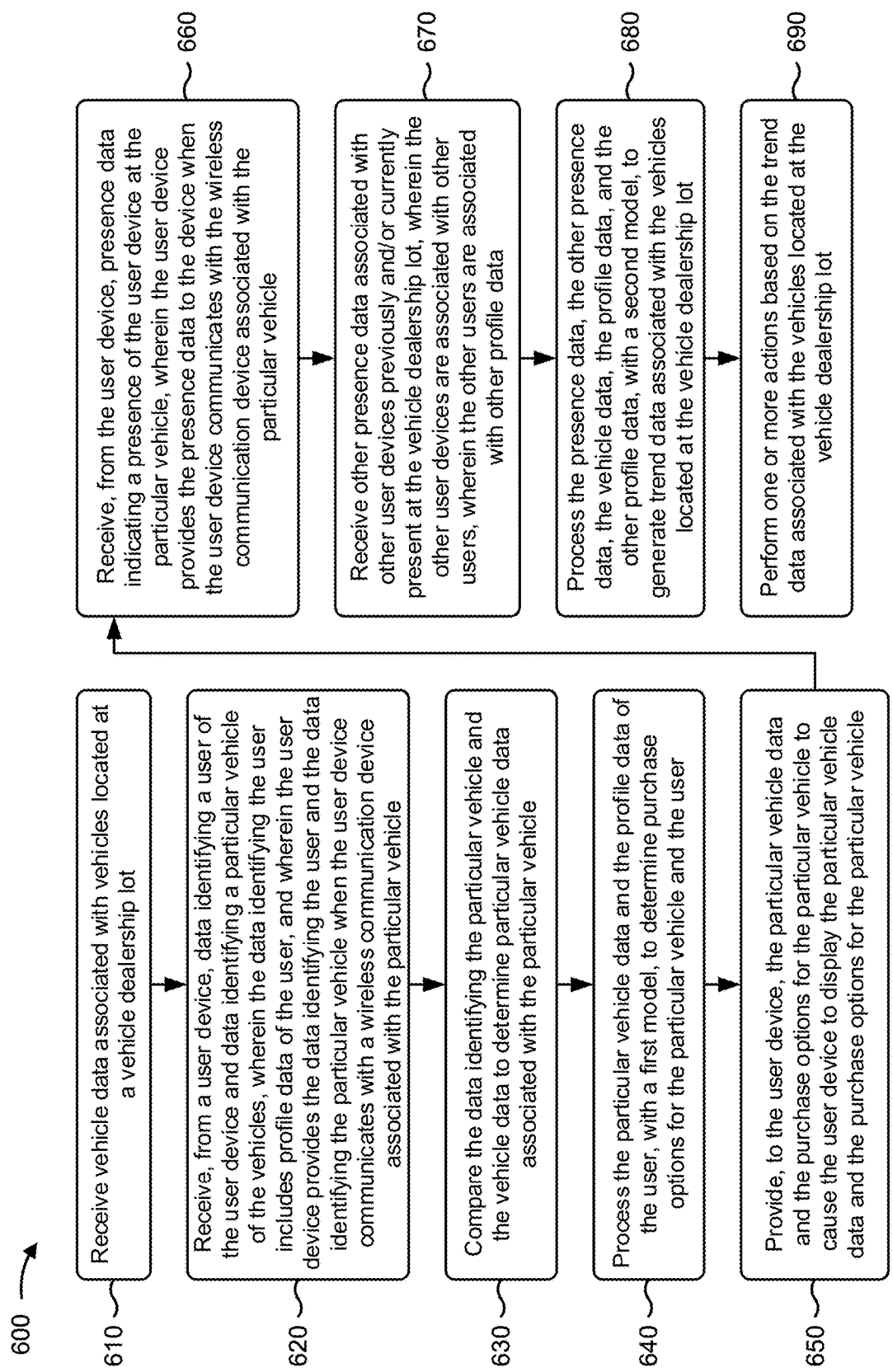

ial vehicle. The user device may provide the presence data to the device when the user device communicates with the wireless communication device associated with the particular vehicle. The one or more processors may process the presence data and other presence data associated with other user devices previously and/or currently present at the vehicle dealership lot, with a second model, to generate a heat map for the vehicles located at the vehicle dealership lot, wherein the heat map may provide an indication of levels of interest in the vehicles located at the vehicle dealership lot. The one or more processors may provide the heat map to another user device associated with a representative of the vehicle dealership lot.

UTILIZING MACHINE LEARNING TO GENERATE VEHICLE INFORMATION FOR A VEHICLE CAPTURED BY A USER DEVICE IN A VEHICLE LOT

BACKGROUND

Vehicle dealerships are one of the few remaining businesses that have yet to be replaced by e-commerce websites. This is due to customers wanting more from a vehicle-buying experience than what a simple click of a button can provide. Customers want education about the vehicles, test drives of the vehicles, all-around service for the vehicles, and/or the like. In order to sell vehicles, vehicle dealerships typically maintain large lots of new and/or used vehicles for customers to view and/or test drive.

SUMMARY

According to some implementations, a method may include receiving vehicle data associated with vehicles located at a vehicle dealership lot, and receiving, from a user device, data identifying a user of the user device and data identifying a particular vehicle of the vehicles. The data identifying the user may include profile data of the user, and the user device may provide the data identifying the user and the data identifying the particular vehicle when the user device communicates with a wireless communication device associated with the particular vehicle. The method may include comparing the data identifying the particular vehicle and the vehicle data to determine particular vehicle data associated with the particular vehicle, wherein the particular vehicle data includes data identifying one or more of a make of the particular vehicle, a model of the particular vehicle, a year of the particular vehicle, a quantity of time that the particular vehicle has been located at the vehicle dealership lot, a level of interest in the particular vehicle, or a price of the particular vehicle. The method may include processing the particular vehicle data and the profile data of the user, with a first model, to determine purchase options for the particular vehicle and the user, and providing, to the user device, the particular vehicle data and the purchase options for the particular vehicle to cause the user device to display the particular vehicle data and the purchase options for the particular vehicle.

According to some implementations, a device may include one or more memories and one or more processors, communicatively coupled to the one or more memories, to receive vehicle data associated with vehicles located at a vehicle dealership lot, and receive, from a user device, data identifying a user of the user device and data identifying a particular vehicle of the vehicles. The data identifying the user may include profile data of the user, and the user device may provide the data identifying the user and the data identifying the particular vehicle when the user device communicates with a wireless communication device associated with the particular vehicle. The one or more processors may compare the data identifying the particular vehicle and the vehicle data to determine particular vehicle data associated with the particular vehicle, and may process the particular vehicle data and the profile data of the user, with a first model, to determine purchase options for the particular vehicle and the user. The one or more processors may provide, to the user device, the particular vehicle data and the purchase options for the particular vehicle to cause the user device to display the particular vehicle data and the purchase options for the particular vehicle, and may receive, from the user device, presence data indicating a presence of the user device at the particu- According to some implementations, a non-transitory computer-readable medium may store instructions that include one or more instructions that, when executed by one or more processors of a device, cause the one or more processors to receive vehicle data associated with vehicles located at a vehicle dealership lot, and receive, from a user device, data identifying a user of the user device and data identifying a particular vehicle of the vehicles. The data identifying the user may include profile data of the user, and the user device may provide the data identifying the user and the data identifying the particular vehicle when the user device communicates with a wireless communication device associated with the particular vehicle. The one or more instructions may cause the one or more processors to compare the data identifying the particular vehicle and the vehicle data to determine particular vehicle data associated with the particular vehicle and process the particular vehicle data and the profile data of the user, with a first model, to determine purchase options for the particular vehicle and the user. The one or more instructions may cause the one or more processors to provide, to the user device, the particular vehicle data and the purchase options for the particular vehicle to cause the user device to display the particular vehicle data and the purchase options for the particular vehicle, and receive, from the user device, presence data indicating a presence of the user device at the particular vehicle. The user device may provide the presence data to the device when the user device communicates with the wireless communication device associated with the particular vehicle. The one or more instructions may cause the one or more processors to receive other presence data associated with other user devices previously and/or currently present at the vehicle dealership lot, wherein the other user devices may be associated with other users and the other users may be associated with other profile data. The one or more instructions may cause the one or more processors to process the presence data, the other presence data, the vehicle data, the profile data, and the other profile data, with a second model, to generate trend data associated with the vehicles located at the vehicle dealership lot, and perform one or more actions based on the trend data associated with the vehicles located at the vehicle dealership lot.

BRIEF DESCRIPTION OF THE DRAWINGS

FIGS. 1A-1H are diagrams of one or more example implementations described herein.

FIGS. 4-6 are flow charts of example processes for utilizing machine learning to generate vehicle information for a vehicle captured by a user device in a vehicle lot.

DETAILED DESCRIPTION

Figure 1A:
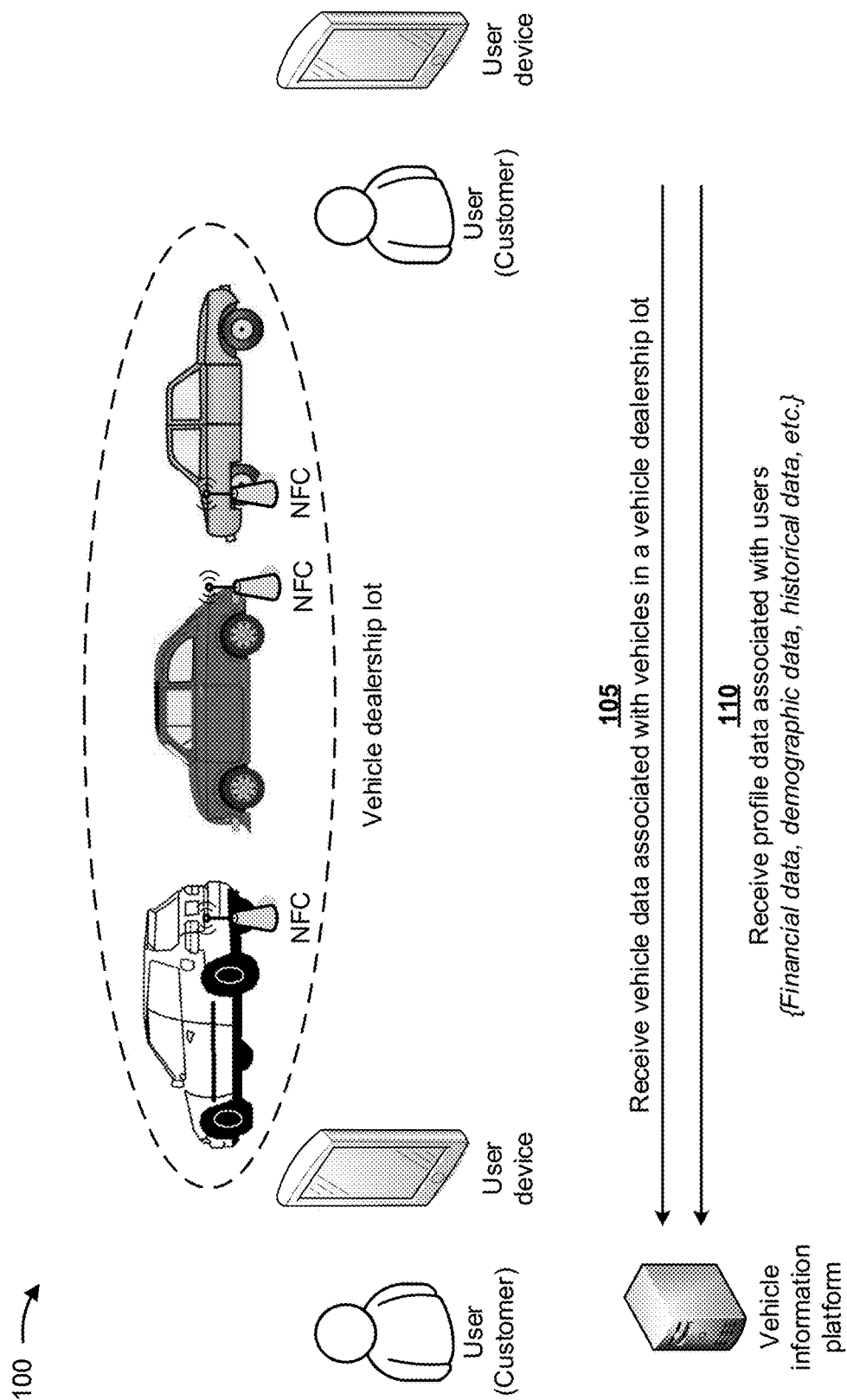

The following detailed description of example implementations refers to the accompanying drawings. The same reference numbers in different drawings may identify the same or similar elements.

Searching for a vehicle online can be a painful experience for many customers due to the quantity of information available on the Internet. Locating a vehicle, checking for vehicle buying eligibility, exploring payment options, and/or the like may be tedious, time consuming, and exhausting. When visiting vehicle dealership lots, customers typically require the assistance of dealership representatives to receive additional information about vehicles (e.g., other than what is listed on window stickers). However, many customers dread dealing with such representatives and feel that the representatives are trying to sell vehicles that profit their interests. Thus, these customers wish to avoid dealing with the representatives but lack the capabilities to do so.

Currently there is an inefficient use of computer and network resources to find a vehicle to purchase and/or lease due to excessive amounts of time performing Internet searches and reviewing vehicle listings to try to locate a vehicle, which includes waste on user devices, computer servers, and network devices to process such searches and reviews. Furthermore, there is excessive wear and tear on a user's vehicle and excessive vehicle fuel consumption by the user's vehicle (e.g., because the user travels from dealership to dealership looking for a vehicle). Finally, vehicle dealerships waste computer and network resources by inefficiently providing promotions for vehicles, displaying vehicles on Internet sites and vehicle lots, and/or the like.

Some implementations described herein provide a vehicle information platform that utilizes machine learning to generate vehicle information for a vehicle captured by a user device and in close proximity to the user device. For example, the vehicle information platform may receive vehicle data associated with vehicles located at a vehicle dealership lot, and may receive, from a user device, data identifying a user of the user device and data identifying a particular vehicle of the vehicles. The data identifying the user may include profile data of the user, and the user device may provide the data identifying the user and the data identifying the particular vehicle after or when the user device communicates with a wireless communication device associated with the particular vehicle. The vehicle information platform may compare the data identifying the particular vehicle and the vehicle data to determine particular vehicle data associated with the particular vehicle, wherein the particular vehicle data includes data identifying a make of the particular vehicle, a model of the particular vehicle, a year of the particular vehicle, a quantity of time that the particular vehicle has been located at the vehicle dealership lot, a level of interest in the particular vehicle, a price of the particular vehicle, and/or the like. The vehicle information platform may process the particular vehicle data and the profile data of the user, with a first model, to determine purchase options for the particular vehicle and the user, and may provide, to the user device, the particular vehicle data and the purchase options for the particular vehicle to cause the user device to display the particular vehicle data and the purchase options for the particular vehicle.

In this way, the vehicle information platform provides an efficient use of computer and network resources by providing a user with information about vehicles that was not previously available to the user or not previously easy to locate. The vehicle information platform enables customers to have necessary information to negotiate prices for vehicles, which saves time and resources (e.g., processing resources, memory resources, and/or the like) for the customers and/or representatives of a vehicle dealership that would otherwise be wasted in attempting to receive information about the vehicles, sell the vehicles, purchase the vehicles, and/or the like. Furthermore, the vehicle information platform the invention reduces vehicle wear and tear, and fuel consumption by the user's vehicle (e.g., driving around to multiple vehicle lots), by providing a user with information not previously available to the user to assist the user in finding a vehicle at a vehicle dealership lot.

FIGS. 1A-1H are diagrams of one or more example implementations 100 described herein. As shown in FIG. 1A, user devices, associated with users (e.g., customers of a vehicle dealership), may be associated with a vehicle delivery platform. In some implementations, the vehicle dealership may maintain and display vehicles (e.g., new or used vehicles) in a vehicle dealership lot. The vehicles may be associated with corresponding short-range wireless communication devices, such as near-field communication (NFC) devices, Bluetooth devices, infrared devices, ultraband devices, Zigbee devices, and/or the like. In some implementations, one or more of the user devices may establish wireless communications with the short-range wireless communication devices as described below.

As further shown in FIG. 1A, and by reference number 105, the vehicle information platform may receive (e.g., from an inventory management system of the dealership) vehicle data associated with the vehicles in the vehicle dealership lot. In some implementations, the vehicle data may include data identifying the short-range wireless communication devices associated with the vehicles, makes of the vehicles, models of the vehicles, manufactured years associated with the vehicles, quantities of times that the vehicles have been located at the vehicle dealership lot, levels of interest in the vehicles, prices of the vehicles, features of the vehicles (e.g., exterior colors, interior colors, safety features, etc.), and/or the like.

As further shown in FIG. 1A, and by reference number 110, the vehicle information platform may receive profile data associated with the users of the user devices. In some implementations, the users may utilize (or may have previously utilized) the user devices (or other user devices) to request and receive an application (e.g., a vehicle information application) from the vehicle information platform. The vehicle information application may enable the user devices to perform functions described herein as being performed by the user devices. In some implementations, the vehicle information application may permit the users to provide, to the vehicle information platform, the profile data associated with the users. In some implementations, the vehicle information platform may have access to the profile data, without the users having to explicitly provide the profile data to the vehicle information platform. For example, if the vehicle information platform is associated with a financial entity (e.g., an entity that provides loans for leasing and/or purchasing vehicles) that is associated with the users, the vehicle information platform may have access to the profile data via the financial entity.

In some implementations, the profile data may include financial data associated with the users (e.g., annual incomes, credit ratings, financial account information, etc.); demographic data associated with the users (e.g., physical addresses, races, ethnicities, genders, ages, education levels, professions, occupations, marital status, etc.); historical data associated with the users (e.g., prior vehicles purchased or leased, data indicating whether the users purchased or leased vehicles from the vehicle dealership, levels of interest in the vehicles at the vehicle dealership, etc.); account data (e.g., usernames, identifiers, passwords, email addresses, telephone numbers, etc.); and/or the like.

Figure 1B:
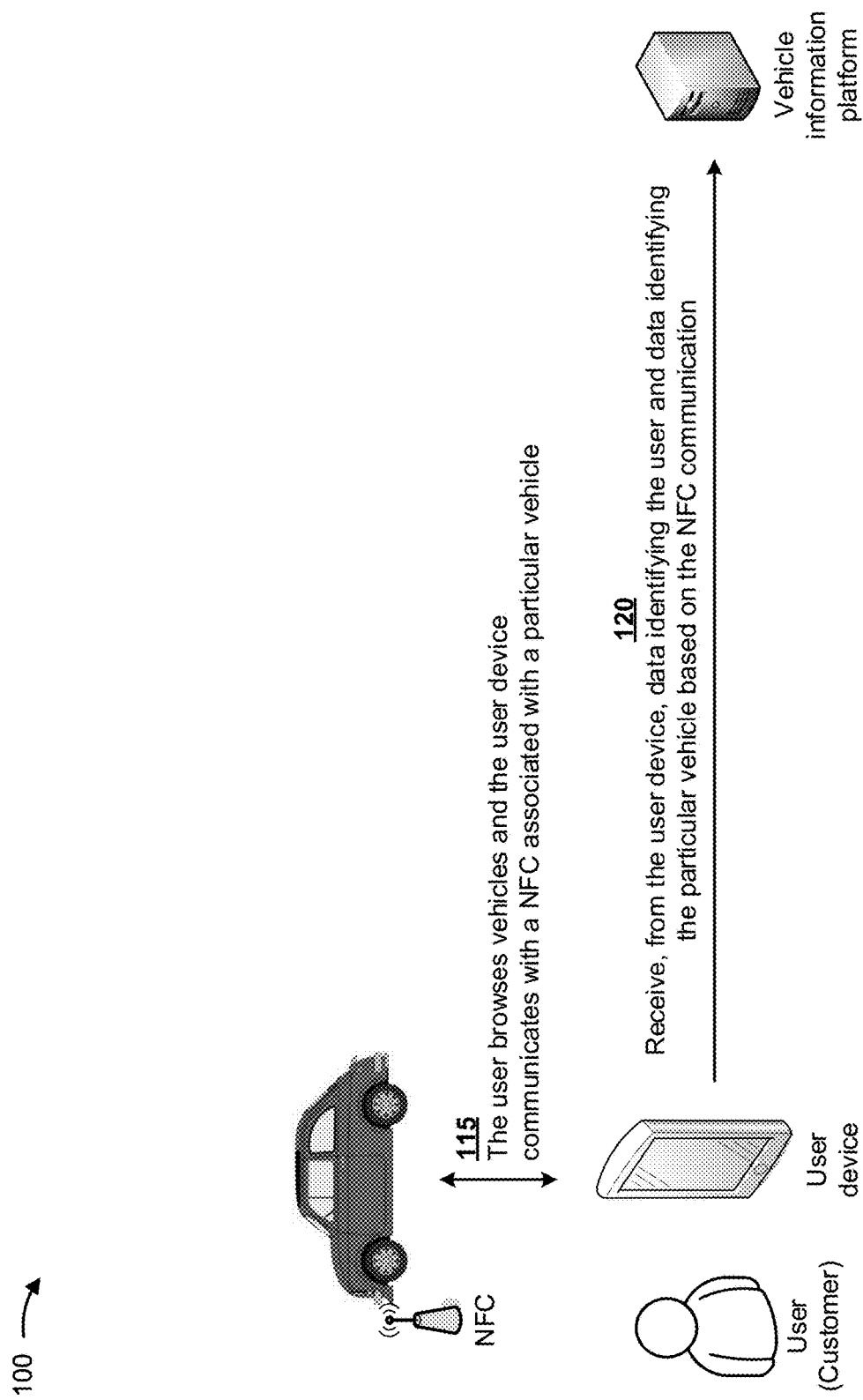

As shown in FIG. 1B, a user (e.g., one of the customers at the vehicle dealership lot) may be browsing vehicles at the vehicle dealership lot and may approach a particular vehicle at the vehicle dealership lot. When the user gets close enough to the particular vehicle (e.g., within communication range of the short-range wireless communication device associated with the vehicle), the user device may communicate with the short-range wireless communication device associated with the particular vehicle, as indicated by reference number 115 in FIG. 1B. In some implementations, the communication with the short-range wireless communication device may be detected by the vehicle information application and the vehicle information application may cause the user device to wake up and/or unlock without user interaction, which conserves resources of the user device by permitting the user device to be in a sleep state until the user device is in communication range of the short-range wireless communication device. In some implementations, the short-range wireless communication device may provide, to the user device, data identifying the particular vehicle and/or the short-range wireless communication device or the user may input the data identifying the particular vehicle to the user device. The vehicle information application may then cause the user device to provide, to the vehicle information platform, data identifying the user and/or the user device and data identifying the particular vehicle based on the communication with the short-range wireless communication device.

As further shown in FIG. 1B, and by reference number 120, the vehicle information platform may receive, from the user device, the data identifying the user and/or the user device and the data identifying the particular vehicle. In some implementations, the data identifying the user and/or the user device may include data identifying the user (e.g., a name of the user, a username, a user password, etc.); an account of the user identified via the vehicle information application; an identifier of the user device (e.g., a telephone number, an International Mobile Subscriber Identity (IMSI), an International Mobile Equipment Identity (IMEI), a mobile device identifier, etc.); and/or the like.

In some implementations, the data identifying the particular vehicle may include location data of the short-range wireless communication device associated with the particular vehicle (e.g., indicating that the user has been proximate to the particular vehicle for a threshold period of time), an identifier associated with the short-range wireless communication device, an identifier of the particular vehicle (e.g., a vehicle identification number, a make, a model, manufactured year, etc.), location data of the particular vehicle in the vehicle dealership lot, a vehicle identification mechanism (e.g., a barcode, a serial number, a matrix code, etc.) that may be captured by the user device and may identify the particular vehicle, and/or the like. In some implementations, the vehicle information platform may utilize the data identifying the particular vehicle to update an inventory of the vehicles in the vehicle dealership lot. For example, the vehicle information platform may compare the data identifying the particular vehicle with vehicle inventory data (e.g., maintained by an inventory management system of the dealership) in order to verify that the particular vehicle is accounted for in the vehicle inventory data. In some implementations, if the particular vehicle is missing from the vehicle inventory data, the vehicle information platform may provide, to a user device associated with a representative of the vehicle dealership, a notification indicating that the particular vehicle is missing from the vehicle inventory data.

Figure 1C:
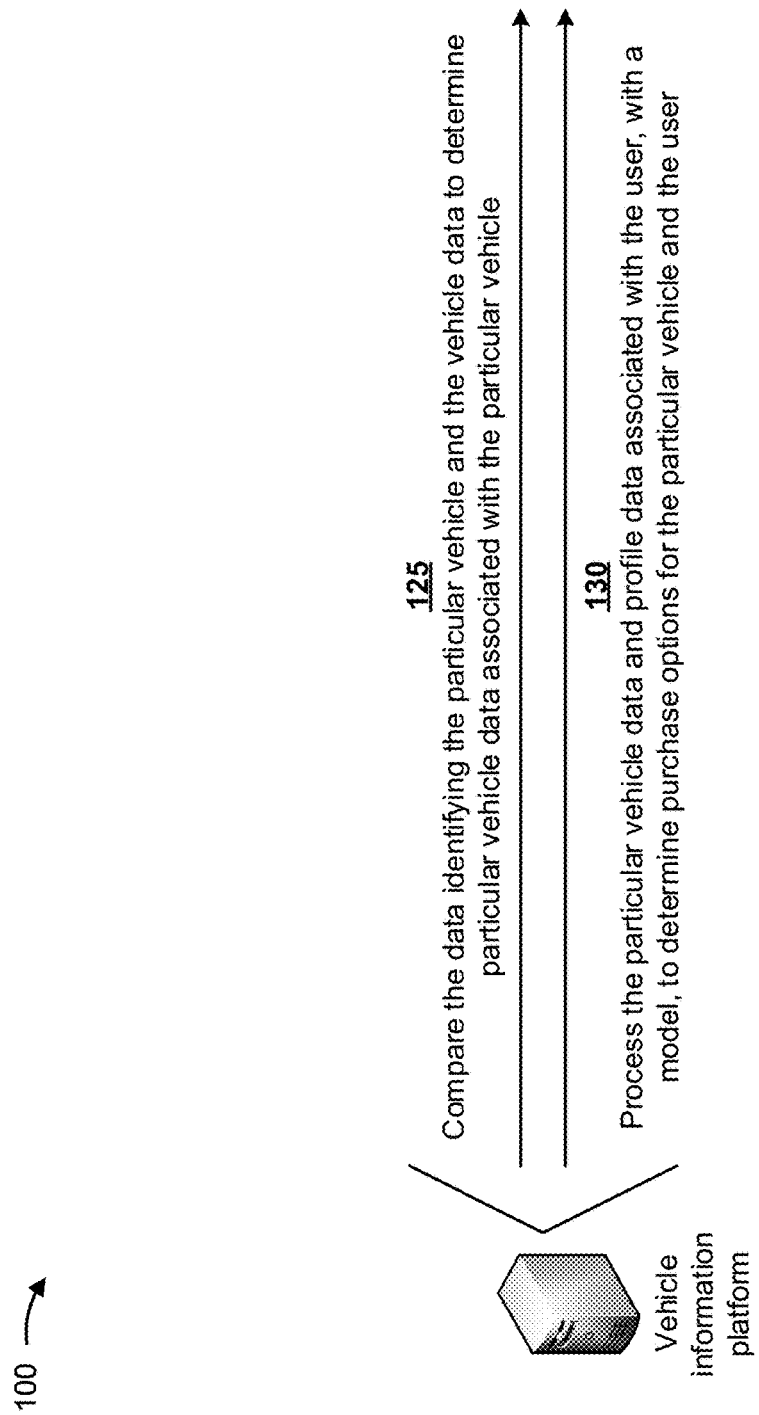

As shown in FIG. 1C, and by reference number 125, the vehicle information platform may compare the data identifying the particular vehicle and the vehicle data to determine particular vehicle data associated with the particular vehicle. In some implementations, the vehicle information platform may compare the data identifying the particular vehicle to determine whether the data matches at least one of the vehicles identified by the vehicle data. For example, the vehicle information platform may compare the data identifying the short-range wireless communication device associated with the particular vehicle and the data identifying the short-range wireless communication devices associated with the vehicles (e.g., provided in the vehicle data). If the data identifying the short-range wireless communication device associated with the particular vehicle matches one of the data identifying the short-range wireless communication devices associated with the vehicles, then the vehicle information platform may determine the vehicle data associated with the matching short-range wireless communication device to be the particular vehicle data. In some implementations, the particular vehicle data may include a make of the particular vehicle, a model of the particular vehicle, a manufactured year associated with the particular vehicle, a quantity of time that the particular vehicle has been located at the vehicle dealership lot, a level of interest in the particular vehicle, a price of the particular vehicle, features of the particular vehicle (e.g., an exterior color, an interior color, a safety feature, etc.), and/or the like.

As further shown in FIG. 1C, and by reference number 130, the vehicle information platform may process the particular vehicle data and profile data associated with the user, with a model, to determine purchase options for the particular vehicle and the user. For example, the model may receive the particular vehicle data and the profile data associated with the user as inputs and may output a recommendation of the purchase options for the particular vehicle and the user based on the inputs. In some implementations, the model may include a machine learning model, such as a pattern recognition model that identifies purchase options for the particular vehicle and the user (e.g., based on the account information of the user, a period of time the particular vehicle has been present on the vehicle lot, and/or the like). In some implementations, the purchase options may include multiple pre-approved monthly lease payment options for the particular vehicle by the user, multiple pre-approved monthly purchase payment options for the particular vehicle by the user, a bluebook value of the particular vehicle, and/or the like.

In some implementations, the vehicle information platform may perform a training operation on the machine learning model with historical data. In some implementations, the historical data may include historical data identifying monthly purchase or lease payment options for vehicles by users, credit ratings of the users, makes of the vehicles, models of the vehicles, years of the vehicles, mileages of the vehicles, prices of vehicles, and/or the like. The vehicle information platform may separate the historical data into a training set, a validation set, a test set, and/or the like. The training set may be utilized to train the machine learning model. The validation set may be utilized to validate results of the trained machine learning model. The test set may be utilized to test operations of the machine learning model.

In some implementations, the vehicle information platform may train the machine learning model using, for example, an unsupervised training procedure and based on the historical data. For example, the vehicle information platform may perform dimensionality reduction to reduce the historical data to a minimum feature set, thereby reducing resources (e.g., processing resources, memory resources, and/or the like) required to train the machine learning model to identify purchase options for a vehicle and the user, and may apply a classification technique to the minimum feature set.

In some implementations, the vehicle information platform may use a logistic regression classification technique to determine a categorical outcome (e.g., particular purchase options to be utilized for particular vehicles and/or users). Additionally, or alternatively, the vehicle information platform may use a naïve Bayesian classifier technique. In this case, the vehicle information platform may perform binary recursive partitioning to split the historical data into partitions and/or branches and use the partitions and/or branches to perform predictions (e.g., particular purchase options to be utilized for particular vehicles and/or users). Based on using recursive partitioning, the vehicle information platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the vehicle information platform may use a support vector machine (SVM) classifier technique to generate a non-linear boundary between data points in the training set. In this case, the non-linear boundary is used to classify test data into a particular class.

Additionally, or alternatively, the vehicle information platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the vehicle information platform may use one or more other model training techniques, such as a neural network technique, a latent semantic indexing technique, and/or the like. For example, the vehicle information platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by the vehicle information platform by being more robust to noisy, imprecise, or incomplete data, and by enabling the vehicle information platform to detect patterns and/or trends undetectable to human analysts or systems using less complex techniques.

In use, the trained machine learning model may receive the particular vehicle data and the profile data associated with the user as inputs and may output a recommendation of the purchase options for the particular vehicle and the user based on the inputs. In some implementations, only purchase options most relevant to the user may be provided to increase efficiency of negotiations, prices may be automatically reduced and/or raised based on heatmaps, days in the dealership, etc.

Figure 1D:
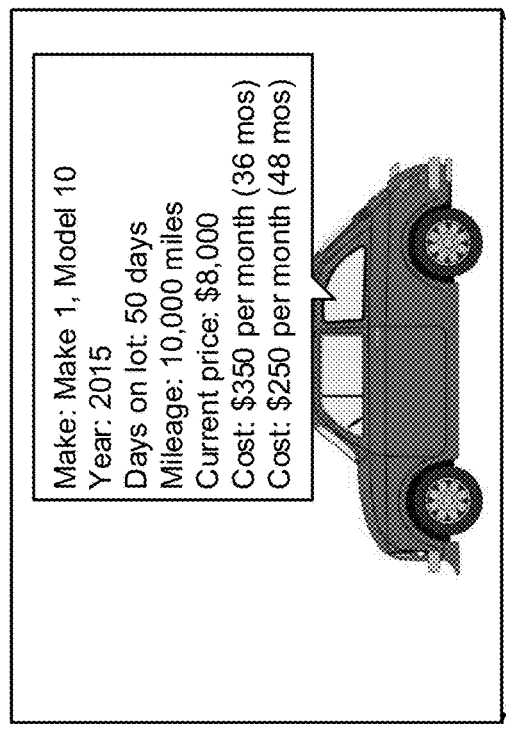
Figure 1D:
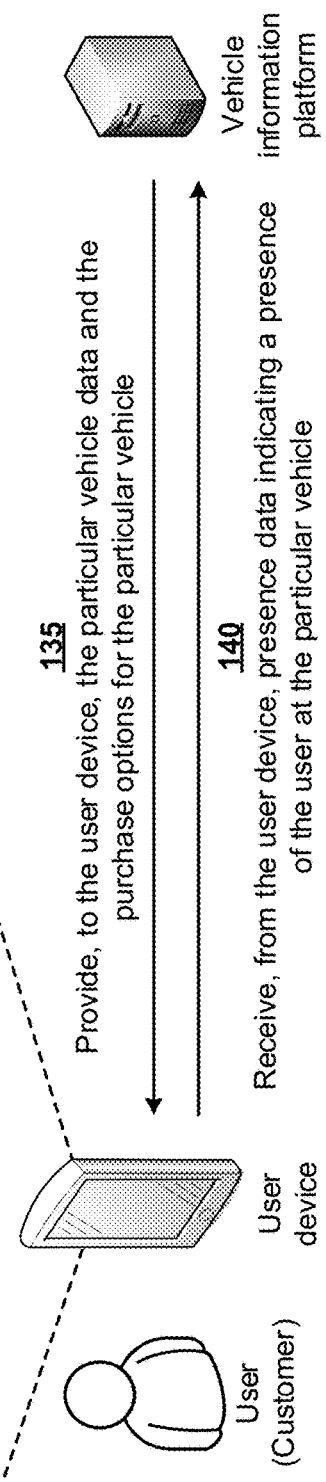

As shown in FIG. 1D, and by reference number 135, the vehicle information platform may provide, to the user device, the particular vehicle data and the purchase options for the particular vehicle. The user device may receive the particular vehicle data and the purchase options for the particular vehicle and may display the particular vehicle data and the purchase options for the particular vehicle via a user interface. For example, the user interface may include information indicating that the particular vehicle make is a Make 1, that the particular vehicle model is a Model 1, that the particular vehicle was manufactured in 2015, that the particular vehicle has been on the vehicle dealership lot for fifty (50) days, that the mileage of the particular vehicle is 10,000 miles, and that the price of the particular vehicle is $8,000, that a thirty-six (36) month payment plan (e.g., purchase or lease) is $350 per month, that a forty-eight (48) month payment plan (e.g., purchase or lease) is $250 per month, and/or the like. In some implementations, the particular vehicle data and the purchase options for the particular vehicle may be rendered, by the user device, as a balloon or a billboard over an actual image of the particular vehicle. In some implementations, the particular vehicle data and the purchase options for the particular vehicle may be rendered, by the user device, as augmented reality information (e.g., with a captured image of the particular vehicle), as virtual reality information, and/or the like (e.g., so that the user may view the particular vehicle at a location other than the dealership).

In some implementations, the vehicle information platform may provide, for display by the user device, other data to assist the user in purchasing or selecting a vehicle, such as data indicating how many users have looked at the particular vehicle (e.g., have looked at the particular vehicle online, have looked at the vehicle in person at the vehicle dealership lot, and/or the like); when did a last user looked at the particular vehicle (e.g., looked at the particular vehicle online versus in person); user feedback ratings of the particular vehicle (e.g., on line users and/or in person users may rate the particular vehicle even if the users do not end up purchasing the particular vehicle); what other vehicles does the dealer have like the particular vehicle and where such vehicles are located on the vehicle dealership lot (e.g., with step-by-step instructions indicating how to get to each of the other vehicles); personal information about the user (e.g., which account of the user could be used for a down payment; which date is best for the user to purchase the particular vehicle based on when the user gets paid, based on what expenses the user already has, etc.; etc.); and/or the like. In this way, the vehicle information platform eliminates the waste of computer and network resources discussed above for current systems.

As further shown in FIG. 1D, and by reference number 140, the vehicle information platform may receive, from the user device, presence data indicating a presence of the user at the particular vehicle. In some implementations, the user device may provide the presence data to the vehicle information platform when the user device communicates with the short-range wireless communication device associated with the particular vehicle. Once the user device ceases communications with the short-range wireless communication device (e.g., by moving a threshold distance away from the short-range wireless communication device and the particular vehicle), the user device may not provide, to the vehicle information platform, the presence data indicating a presence of the user at the particular vehicle. This may provide an indication that the user is not viewing or interested in the particular vehicle and has moved to another vehicle. In this way, the vehicle information platform may receive information indicating vehicles that are of interest to the user.

In some implementations, the vehicle information platform may receive other presence data associated with other user devices previously and/or currently present at the vehicle dealership lot. The other user devices may be associated with other users and other vehicles. The other users may previously and/or currently utilize the other user devices to communicate with one or more short-range wireless communication devices associated with one or more of the vehicles located at the vehicle dealership lot. In this way, the vehicle information platform may receive information indicating vehicles that are of interest to the other users.

In some implementations, the user device and the other user devices may provide the presence data to the vehicle information platform when the user device and the other user devices communicate with the short-range wireless communication devices for a threshold period of time. In this way, the vehicle information platform may not receive presence data from user devices associated with users that are just walking around the vehicle dealership lot.

As shown in FIG. 1E, and by reference number 145, the vehicle information platform may process the presence data indicating the presence of the user and the other presence data associated with the other users previously and/or currently present at the vehicle dealership lot, with a model, to generate a heat map and/or a recommendation based on a heat map for the vehicles at the vehicle dealership lot. In some implementations, the heat map may include a representation of data in the form of a map or a diagram in which data values are represented as colors. For example, the colors of the heat map may provide an indication of levels of interest in the vehicles located at the vehicle dealership lot. The levels of interest may be determined based on the presence data and the other presence data, where a greatest level of interest may be associated with a vehicle that is viewed (e.g., as indicated by the presence data) the most by the users, a least level of interest may be associated with a vehicle that is viewed (e.g., as indicated by the presence data) the least by the users, and/or the like. In some implementations, the vehicle information platform may generate a graphical representation, indicating the levels of the interest in the vehicles, that is different than the heat map.

In some implementations, the model may include a machine learning model, such as a pattern recognition model that identifies levels of interest in the vehicles at the vehicle dealership lot based on the presence data and the other presence data. In some implementations, the vehicle information platform may perform a training operation on the machine learning model with historical data identifying historical levels of interest in vehicles, historical presence data for the vehicles, and/or the like, as described above in connection with FIG. 1C. In some implementations, the machine learning model may receive the presence data and the other presence data as inputs, and may output recommendations (e.g., based on the heat map) as to where to allocate vehicles in the vehicle dealership lot, which vehicles to add to the inventory, etc. based on the inputs.

Figure 1F:
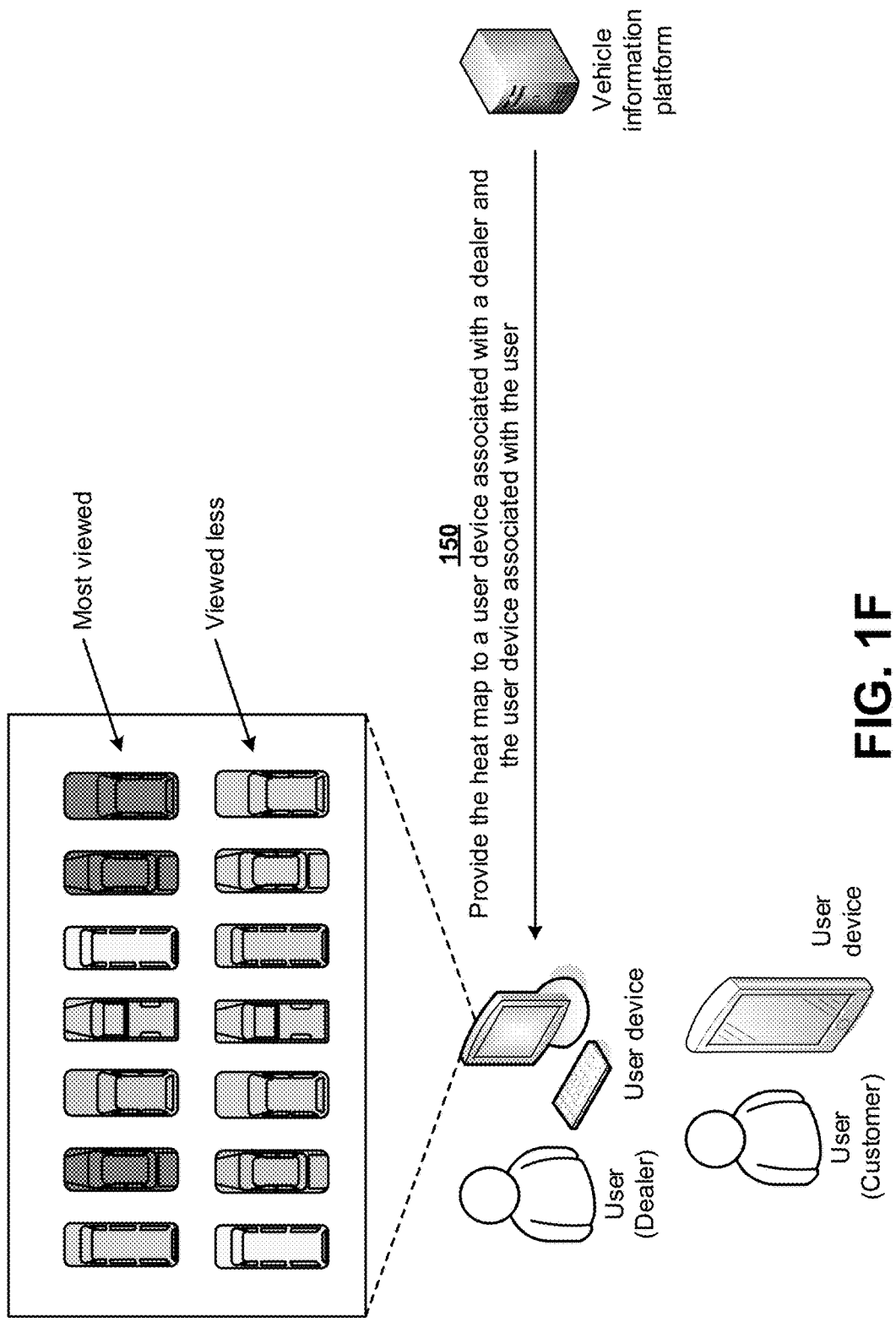

As shown in FIG. 1F, and by reference number 150, the vehicle information platform may provide the heat map to a user device associated with a dealer (e.g., a representative of the vehicle dealership) and/or the user device associated with the user (e.g., the customer). The dealer's user device and/or the user's user device may receive the heat map and may display the heat map via a user interface. For example, the user interface (e.g., displaying the heat map) may include representations of the vehicles located at the vehicle dealership lot, and the representations may include different colors that provide indications of levels of interest in the vehicles located at the vehicle dealership lot. In one example, a first color (e.g., red) may indicate a greater level of interest in a vehicle that is viewed more by the users, a second color (e.g., grey) may indicate a lesser level of interest in a vehicle that is viewed less by the users, and/or the like. As further shown in FIG. 1F, a top right vehicle representation may be viewed the most by the users (e.g., as indicated by a first color), a bottom right vehicle representation may be viewed less by the users (e.g., as indicated by a second color). In some implementations, the dealer's user device may utilize the heat map to perform the one or more actions described below in connection with FIG. 1H.

Figure 1G:
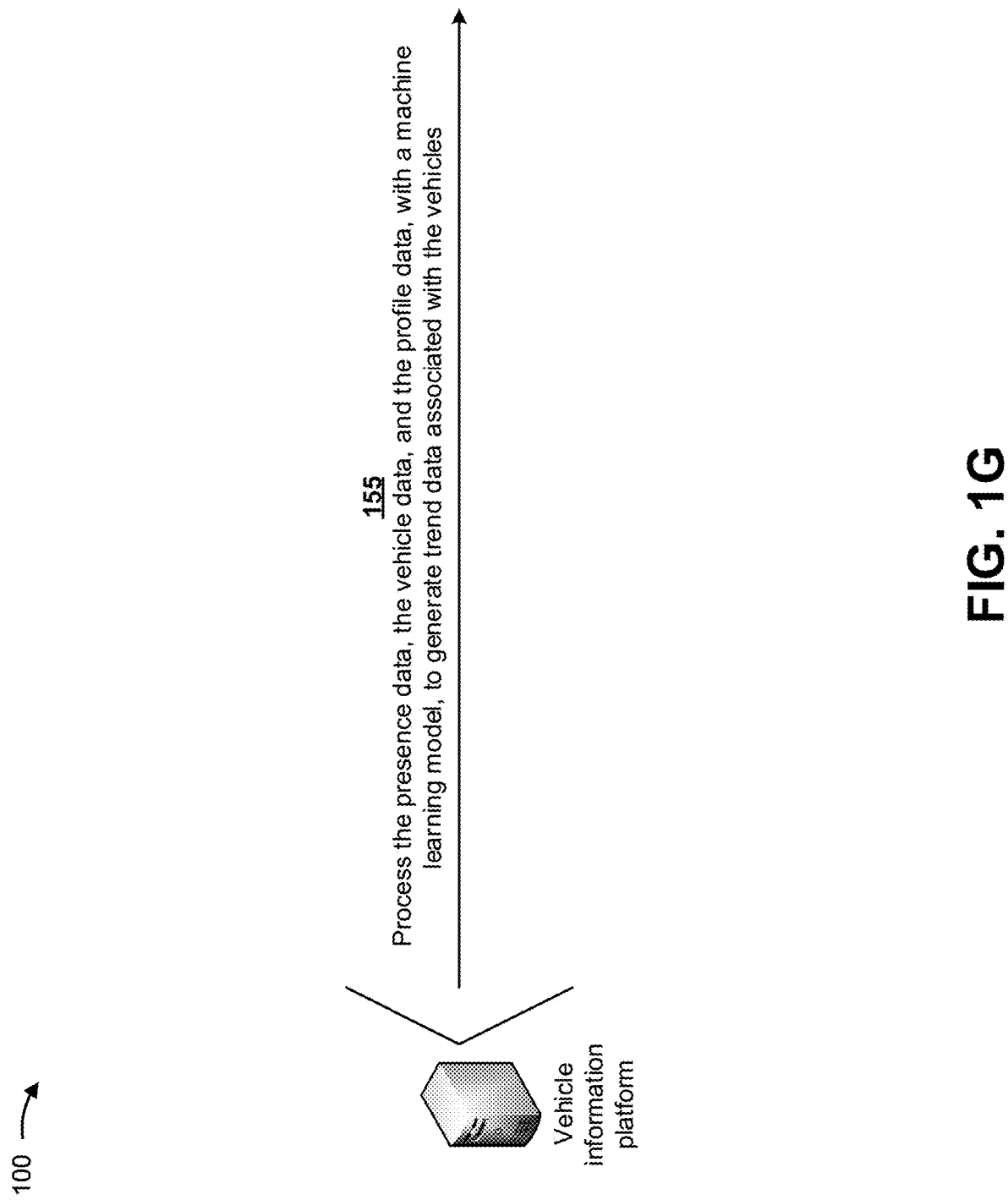

As shown in FIG. 1G, and by reference number 155, the vehicle information platform may process the presence data, the other presence data, the vehicle data, and the profile data, with a model, to generate trend data associated with the vehicles located at the vehicle dealership lot. In some implementations, the trend data may include data identifying particular vehicles purchased/leased by users with particular genders, particular annual incomes, particular races, particular ethnicities, particular ages, particular education levels, particular professions, particular occupations, etc.; particular vehicles most viewed by the users on the vehicle dealership lot; particular vehicles least viewed by the users on the vehicle dealership lot; prices associated with the most-viewed vehicles; promotions associated with the most-viewed vehicles; prices associated with the least-viewed vehicles; promotions associated with the least-viewed vehicles; locations of the vehicle dealership lot with the most-viewed vehicles; locations of the vehicle dealership lot with the least-viewed vehicles; and/or the like.

In some implementations, the model may include a machine learning model, such as a pattern recognition model that identifies trend data associated with the vehicles at the vehicle dealership lot based on the presence data, the other presence data, the vehicle data, and the profile data. In some implementations, the vehicle information platform may perform a training operation on the machine learning model with historical data identifying historical vehicle data, historical presence data for the vehicles, historical profile data, and/or the like, as described above in connection with FIG. 1C. The machine learning model may receive the presence data, the other presence data, the vehicle data, and the profile data as inputs, and may output the trend data associated with the vehicles located at the vehicle dealership lot based on the inputs.

Figure 1H:
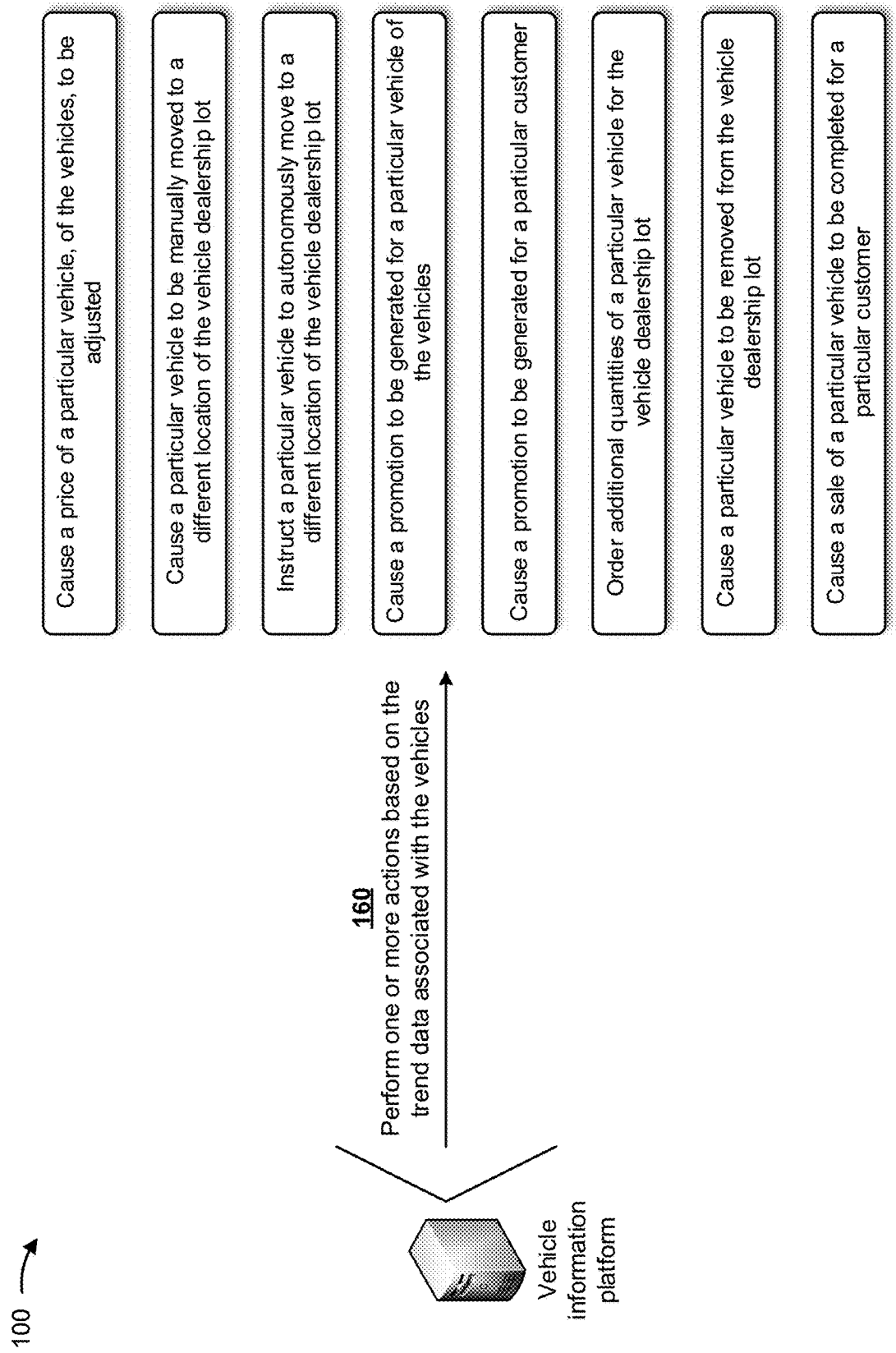

As shown in FIG. 1H, and by reference number 160, the vehicle information platform may perform one or more actions based on the trend data associated with the vehicles. For example, the one or more actions may include the vehicle information platform causing a price of a particular vehicle, of the vehicles, to be adjusted. In this way, the vehicle information platform adjusts prices of the vehicles based on the demand for the vehicles (e.g., as shown by the trend data), which conserves computing resources, network resources, and vehicle resources that would otherwise be wasted in a more-prolonged vehicle search (e.g., which fine tunes negotiations and increases sales efficiency).

In some implementations, the one or more actions may include the vehicle information platform causing a particular vehicle to be manually moved to a different location of the vehicle dealership lot. For example, the vehicle information platform may instruct a representative (e.g., via a user device) to move the particular vehicle to a location where the particular vehicle may be viewed by more customers. In this way, the vehicle information platform conserves computing resources, network resources, and vehicle resources that would otherwise be wasted in a more-prolonged vehicle search, and increases sales potential by expanding customer exposure to vehicle inventory.

In some implementations, the one or more actions may include the vehicle information platform instructing a particular vehicle to autonomously move to a different location of the vehicle dealership lot. For example, the vehicle information platform may instruct the particular vehicle to autonomously move to a location where the particular vehicle may be viewed by more customers. In this way, the vehicle information platform arranges the inventory of the vehicles to locations of the vehicle dealership lot that conserves computing resources, network resources, and vehicle resources that would otherwise be wasted in a more-prolonged vehicle search.

In some implementations, the one or more actions may include the vehicle information platform causing a promotion to be generated for a particular vehicle of the vehicles. For example, the vehicle platform may cause a promotion, that was successful for similar vehicles, to be generated for the particular vehicle. In this way, the vehicle information platform may generate promotions that are successful and sell vehicles for the vehicle dealership, thereby increasing sales efficiency and inventory throughput.

In some implementations, the one or more actions may include the vehicle information platform causing a promotion to be generated for a particular customer. For example, the vehicle platform may cause a promotion, that was successful for similar customers, to be generated for the particular customer at the vehicle dealership lot. In this way, the vehicle information platform may generate promotions that are successful and sell vehicles for the vehicle dealership, which conserves computing resources, network resources, and vehicle resources that would otherwise be wasted in a more-prolonged vehicle search.

In some implementations, the one or more actions may include the vehicle information platform ordering additional quantities of a particular vehicle for the vehicle dealership lot. For example, if the particular vehicle is selling quickly, the vehicle information platform may order the additional quantities of the particular vehicle so that the particular vehicle is available. In this way, the vehicle information platform may ensure that profitable vehicles are available, which conserves resources that would otherwise be wasted attempting to sell less-desirable vehicles.

In some implementations, the one or more actions may include the vehicle information platform causing a particular vehicle to be removed from the vehicle dealership lot. For example, if the particular vehicle has been on the vehicle dealership lot a threshold quantity of days, the vehicle information platform may remove the vehicle from the vehicle dealership lot. In this way, the vehicle information platform maintains an inventory of vehicles on the vehicle dealership lot that conserves computing resources, network resources, and vehicle resources that would otherwise be wasted in a more-prolonged vehicle search.

In some implementations, the one or more actions may include the vehicle information platform causing a sale of a particular vehicle to be completed for a particular customer (e.g., automatically completing paperwork needed to finance the vehicle, transfer the vehicle to the user, and/or the like). In this way, the vehicle information platform enables the customer and the dealership to avoid time-consuming interactions with financial institutions, which conserves resources that would otherwise be wasted performing such interactions.

In some implementations, the vehicle information platform may receive, from the user device, information indicating that the user wishes to speak to a representative of the vehicle dealership lot about the particular vehicle. The vehicle information platform may provide, to another user device associated with the representative of the vehicle dealership, a notification indicating that the user wishes to speak to the representative about the particular vehicle. In some implementations, the notification may include the particular vehicle data, the profile data of the user, the presence data of the user, and/or the like. In some implementations, the user may not wish to be bothered by the representative. In such implementations, the vehicle information platform may receive, from the user device, information indicating that the user does not wish to speak to the representative, information indicating how much the user wishes to communicate via text messaging, calls, emails, etc. with the representative, and/or the like. The vehicle information platform may provide, to the other user device associated with the representative, a notification indicating that the user does not wish to speak to the representative (e.g., a "do not disturb" notification).

In this way, several different stages of the process for generating vehicle information for a vehicle captured by a user device and in proximity to the user device are automated through machine learning, thereby removing human subjectivity and waste from those stages of the process and improving speed and efficiency of the process and conserving computing resources (e.g., processing resources, memory resources, and/or the like). Furthermore, implementations described herein use a rigorous, computerized process to perform tasks or roles that were not previously performed efficiently or objectively. For example, currently there does not exist a technique that provides an efficient use of computer and network resources by providing a user with vehicle information not previously available to the user or not previously easy to locate. Finally, automating the process for generating vehicle information for a vehicle, an image of which is captured by a user device and is in close proximity to the user device, conserves computing resources (e.g., processing resources, memory resources, and/or the like) that would otherwise be wasted attempting to provide, sell, and/or manage entire inventories of new and/or used vehicles.

As indicated above, FIGS. 1A-1H are provided merely as examples. Other examples may differ from what is described with regard to FIGS. 1A-1H.

Figure 2:
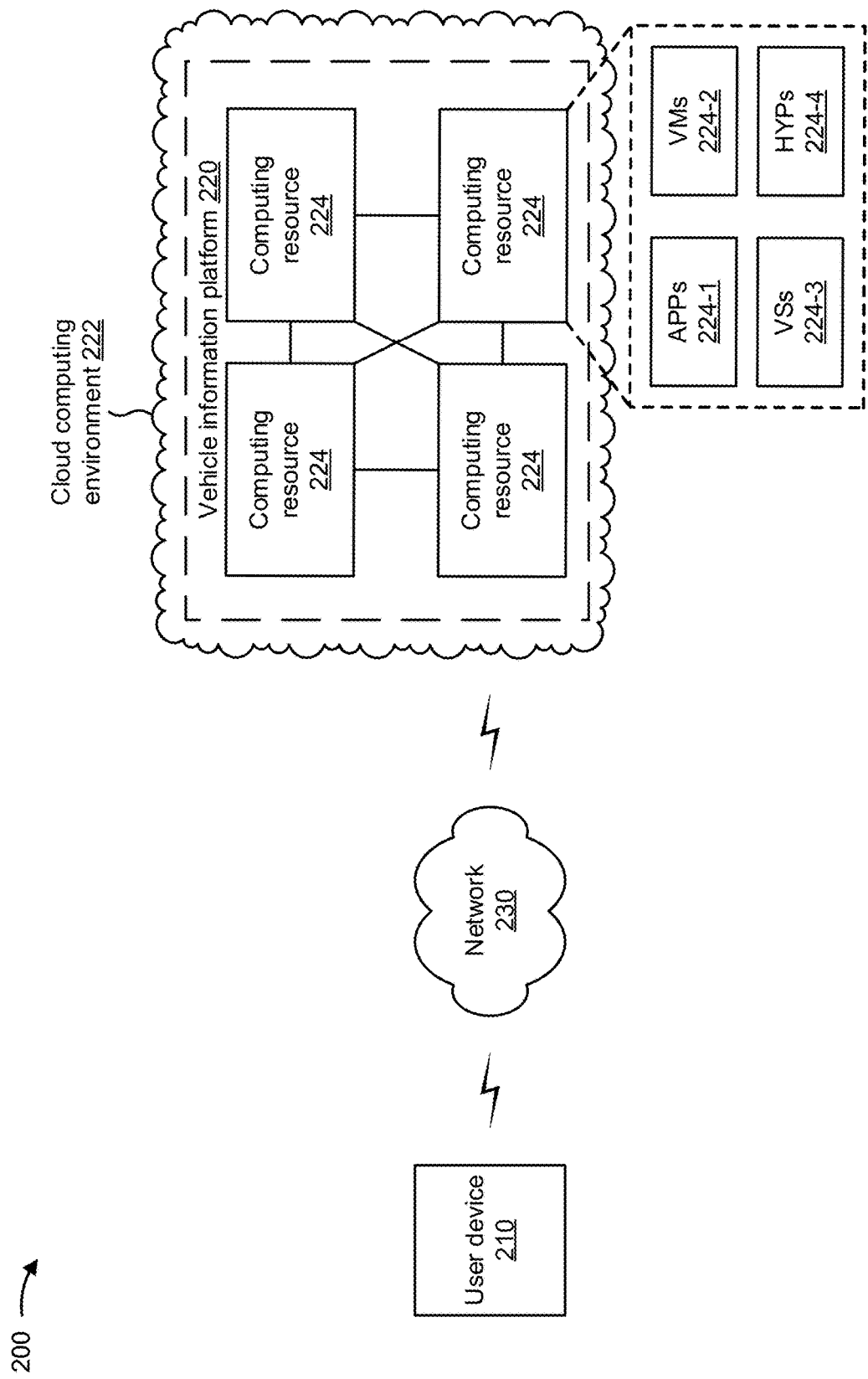
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user device 210, a vehicle information platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to vehicle information platform 220.

Vehicle information platform 220 includes one or more devices that may utilize machine learning to generate vehicle information for a vehicle, an image of which is captured by user device 210 and is in close proximity to user device 210. In some implementations, vehicle information platform 220 may be modular such that certain software components may be swapped in or out depending on a particular need. As such, vehicle information platform 220 may be easily and/or quickly reconfigured for different uses. In some implementations, vehicle information platform 220 may receive information from and/or transmit information to one or more user devices 210.

In some implementations, as shown, vehicle information platform 220 may be hosted in a cloud computing environment 222. Notably, while implementations described herein describe vehicle information platform 220 as being hosted in cloud computing environment 222, in some implementations, vehicle information platform 220 may be non-cloud-based (i.e., may be implemented outside of a cloud computing environment) or may be partially cloud-based.

Cloud computing environment 222 includes an environment that may host vehicle information platform 220. Cloud computing environment 222 may provide computation, software, data access, storage, etc. services that do not require end-user knowledge of a physical location and configuration of system(s) and/or device(s) that host vehicle information platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host vehicle information platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with vehicle information platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 or an operator of vehicle information platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
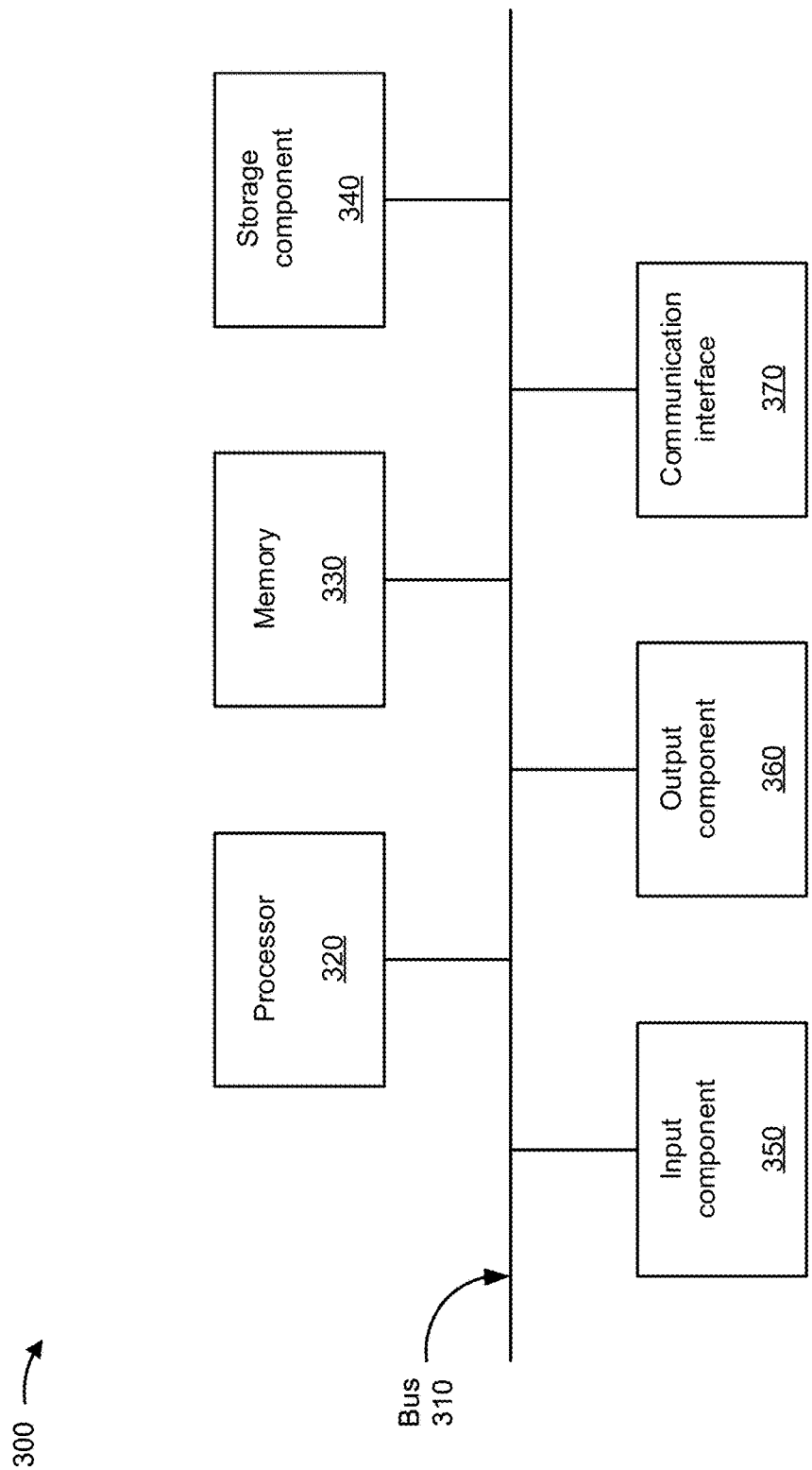
FIG. 3 is a diagram of example components of one or more devices of FIG. 2.

FIG. 3 is a diagram of example components of a device 300. Device 300 may correspond to user device 210, vehicle information platform 220, and/or computing resource 224. In some implementations, user device 210, vehicle information platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing machine learning to generate vehicle information for a vehicle captured by a user device in a vehicle lot. In some implementations, one or more process blocks of FIG. 4 may be performed by a vehicle information platform (e.g., vehicle information platform 220). In some implementations, one or more process blocks of FIG. 4 may be performed by another device or a group of devices separate from or including the vehicle information platform, such as a user device (e.g., user device 210).

As shown in FIG. 4, process 400 may include receiving vehicle data associated with vehicles located at a vehicle dealership lot (block 410). For example, the vehicle information platform (e.g., using computing resource 224, processor 320, communication interface 370, and/or the like) may receive vehicle data associated with vehicles located at a vehicle dealership lot, as described above in connection with FIGS. 1A-2.

As further shown in FIG. 4, process 400 may include receiving, from a user device, data identifying a user of the user device and data identifying a particular vehicle of the vehicles, wherein the data identifying the user includes profile data of the user, and wherein the user device provides the data identifying the user and the data identifying the particular vehicle when the user device communicates with a wireless communication device associated with the particular vehicle (block 420). For example, the vehicle information platform (e.g., using computing resource 224, processor 320, communication interface 370, and/or the like) may receive, from a user device, data identifying a user of the user device and data identifying a particular vehicle of the vehicles, as described above in connection with FIGS. 1A-2. In some implementations, the data identifying the user may include profile data of the user, and the user device may provide the data identifying the user and the data identifying the particular vehicle when the user device communicates with a wireless communication device associated with the particular vehicle.

As further shown in FIG. 4, process 400 may include comparing the data identifying the particular vehicle and the vehicle data to determine particular vehicle data associated with the particular vehicle, wherein the particular vehicle data includes data identifying one or more of: a make of the particular vehicle, a model of the particular vehicle, a year of the particular vehicle, a quantity of time that the particular vehicle has been located at the vehicle dealership lot, a level of interest in the particular vehicle, or a price of the particular vehicle (block 430). For example, the vehicle information platform (e.g., using computing resource 224, processor 320, memory 330, and/or the like) may compare the data identifying the particular vehicle and the vehicle data to determine particular vehicle data associated with the particular vehicle, as described above in connection with FIGS. 1A-2. In some implementations, the particular vehicle data may include data identifying a make of the particular vehicle, a model of the particular vehicle, a year of the particular vehicle, a quantity of time that the particular vehicle has been located at the vehicle dealership lot, a level of interest in the particular vehicle, and/or a price of the particular vehicle.

As further shown in FIG. 4, process 400 may include processing the particular vehicle data and the profile data of the user, with a first model, to determine purchase options for the particular vehicle and the user (block 440). For example, the vehicle information platform (e.g., using computing resource 224, processor 320, storage component 340, and/or the like) may process the particular vehicle data and the profile data of the user, with a first model, to determine purchase options for the particular vehicle and the user, as described above in connection with FIGS. 1A-2.

As further shown in FIG. 4, process 400 may include providing, to the user device, the particular vehicle data and the purchase options for the particular vehicle to cause the user device to display the particular vehicle data and the purchase options for the particular vehicle (block 450). For example, the vehicle information platform (e.g., using computing resource 224, processor 320, memory 330, communication interface 370, and/or the like) may provide, to the user device, the particular vehicle data and the purchase options for the particular vehicle to cause the user device to display the particular vehicle data and the purchase options for the particular vehicle, as described above in connection with FIGS. 1A-2.

Process 400 may include additional implementations, such as any single implementation or any combination of implementations described below and/or described with regard to any other process described herein.

In some implementations, the vehicle information platform may receive, from the user device, presence data indicating a presence of the user device at the particular vehicle, where the user device provides the presence data to the device when the user device communicates with the wireless communication device associated with the particular vehicle; may process the presence data and other presence data associated with other user devices previously and/or currently present at the vehicle dealership lot, with a second model, to generate a heat map for the vehicles located at the vehicle dealership lot, where the heat map provides an indication of levels of interest in the vehicles located at the vehicle dealership lot; and may provide the heat map to the user device and/or to another user device associated with a representative of the vehicle dealership lot.

In some implementations, the vehicle information platform may receive, from the user device, presence data indicating a presence of the user device at the particular vehicle, where the user device provides the presence data to the device when the user device communicates with the wireless communication device associated with the particular vehicle; and may receive other presence data associated with other user devices previously and/or currently present at the vehicle dealership lot, where the other user devices are associated with other users, and where the other users are associated with other profile data. Additionally, the vehicle information platform may process the presence data, the other presence data, the vehicle data, the profile data, and the other profile data, with a second model, to generate trend data associated with the vehicles located at the vehicle dealership lot; and may perform one or more actions based on the trend data associated with the vehicles located at the vehicle dealership lot.

In some implementations, when performing the one or more actions, the vehicle information platform may cause the price of the particular vehicle to be adjusted, may cause the particular vehicle to be manually moved to a different location of the vehicle dealership lot, may instruct the particular vehicle to autonomously move to the different location of the vehicle dealership lot, and/or may cause a promotion to be generated for the particular vehicle. In some implementations, when performing the one or more actions, the vehicle information platform may cause a promotion to be generated for the user for the particular vehicle, may order additional quantities of the particular vehicle for the vehicle dealership lot, may cause the particular vehicle to be removed from the vehicle dealership lot, and/or may cause a sale of the particular vehicle to be completed for user.

In some implementations, the purchase options for the particular vehicle and the user may include data indicating multiple pre-approved monthly payment options for the particular vehicle, and a value (e.g., bluebook value) of the particular vehicle. In some implementations, the vehicle information platform may receive, from the user device, information indicating that the user wishes to speak to a representative of the vehicle dealership lot about the particular vehicle, and may provide, to another user device associated with the representative, a notification indicating that the user wishes to speak to the representative about the particular vehicle, where the notification includes the particular vehicle data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing machine learning to generate vehicle information for a vehicle captured by a user device in a vehicle lot. In some implementations, one or more process blocks of FIG. 5 may be performed by a vehicle information platform (e.g., vehicle information platform 220). In some implementations, one or more process blocks of FIG. 5 may be performed by another device or a group of devices separate from or including the vehicle information platform, such as a user device (e.g., user device 210).

As shown in FIG. 5, process 500 may include receiving vehicle data associated with vehicles located at a vehicle dealership lot (block 510). For example, the vehicle information platform (e.g., using computing resource 224, processor 320, communication interface 370, and/or the like) may receive vehicle data associated with vehicles located at a vehicle dealership lot, as described above in connection with FIGS. 1A-2.

As further shown in FIG. 5, process 500 may include receiving, from a user device, data identifying a user of the user device and data identifying a particular vehicle of the vehicles, wherein the data identifying the user includes profile data of the user, and wherein the user device provides the data identifying the user and the data identifying the particular vehicle when the user device communicates with a wireless communication device associated with the particular vehicle (block 520). For example, the vehicle information platform (e.g., using computing resource 224, processor 320, communication interface 370, and/or the like) may receive, from a user device, data identifying a user of the user device and data identifying a particular vehicle of the vehicles, as described above in connection with FIGS. 1A-2. In some implementations, the data identifying the user may include profile data of the user, and the user device may provide the data identifying the user and the data identifying the particular vehicle when the user device communicates with a wireless communication device associated with the particular vehicle.

As further shown in FIG. 5, process 500 may include comparing the data identifying the particular vehicle and the vehicle data to determine particular vehicle data associated with the particular vehicle (block 530). For example, the vehicle information platform (e.g., using computing resource 224, processor 320, memory 330, and/or the like) may compare the data identifying the particular vehicle and the vehicle data to determine particular vehicle data associated with the particular vehicle, as described above in connection with FIGS. 1A-2.

As further shown in FIG. 5, process 500 may include processing the particular vehicle data and the profile data of the user, with a first model, to determine purchase options for the particular vehicle and the user (block 540). For example, the vehicle information platform (e.g., using computing resource 224, processor 320, storage component 340, and/or the like) may process the particular vehicle data and the profile data of the user, with a first model, to determine purchase options for the particular vehicle and the user, as described above in connection with FIGS. 1A-2.

As further shown in FIG. 5, process 500 may include providing, to the user device, the particular vehicle data and the purchase options for the particular vehicle to cause the user device to display the particular vehicle data and the purchase options for the particular vehicle (block 550). For example, the vehicle information platform (e.g., using computing resource 224, processor 320, communication interface 370, and/or the like) may provide, to the user device, the particular vehicle data and the purchase options for the particular vehicle to cause the user device to display the particular vehicle data and the purchase options for the particular vehicle, as described above in connection with FIGS. 1A-2.

As further shown in FIG. 5, process 500 may include receiving, from the user device, presence data indicating a presence of the user device at the particular vehicle, wherein the user device provides the presence data to the device when the user device communicates with the wireless communication device associated with the particular vehicle (block 560). For example, the vehicle information platform (e.g., using computing resource 224, processor 320, communication interface 370, and/or the like) may receive, from the user device, presence data indicating a presence of the user device at the particular vehicle, as described above in connection with FIGS. 1A-2. In some implementations, the user device may provide the presence data to the device when the user device communicates with the wireless communication device associated with the particular vehicle.

As further shown in FIG. 5, process 500 may include processing the presence data and other presence data associated with other user devices previously and/or currently present at the vehicle dealership lot, with a second model, to generate a heat map for the vehicles located at the vehicle dealership lot, wherein the heat map provides an indication of levels of interest in the vehicles located at the vehicle dealership (block 570). For example, the vehicle information platform (e.g., using computing resource 224, processor 320, memory 330, and/or the like) may process the presence data and other presence data associated with other user devices previously and/or currently present at the vehicle dealership lot, with a second model, to generate a heat map for the vehicles located at the vehicle dealership lot, as described above in connection with FIGS. 1A-2. In some implementations, the heat map may provide an indication of levels of interest in the vehicles located at the vehicle dealership and may be viewed by anyone located at the vehicle dealership.

As further shown in FIG. 5, process 500 may include providing the heat map to another user device associated with a representative of the vehicle dealership lot (block 580). For example, the vehicle information platform (e.g., using computing resource 224, processor 320, communication interface 370, and/or the like) may provide the heat map to another user device associated with a representative of the vehicle dealership lot, as described above in connection with FIGS. 1A-2.

Process 500 may include additional implementations, such as any single implementation or any combination of implementations described below and/or described with regard to any other process described herein.

In some implementations, the vehicle information platform may utilize the data identifying the particular vehicle to validate or update inventory data associated with the particular vehicle. In some implementations, the vehicle information platform may process the presence data, the other presence data, the vehicle data, the profile data, and other profile data, with a third model, to generate trend data associated with the vehicles located at the vehicle dealership lot, where the other profile data is associated with other users of the other user devices; and may perform one or more actions based on the trend data associated with the vehicles located at the vehicle dealership lot.

In some implementations, when performing the one or more actions, the vehicle information platform may cause a price of the particular vehicle to be adjusted, may cause the particular vehicle to be manually moved to a different location of the vehicle dealership lot, may instruct the particular vehicle to autonomously move to the different location of the vehicle dealership lot, may cause a promotion to be generated for the particular vehicle, may cause a promotion to be generated for the user for the particular vehicle, may order additional quantities of the particular vehicle for the vehicle dealership lot, may cause the particular vehicle to be removed from the vehicle dealership lot, and/or may cause a sale of the particular vehicle to be completed for user.

In some implementations, the particular vehicle data may include data identifying a make of the particular vehicle, a model of the particular vehicle, a year of the particular vehicle, a mileage of the particular vehicle, a quantity of time that the particular vehicle has been located at the vehicle dealership lot, a price of the particular vehicle, a level of interest in the particular vehicle, and/or a vehicle history report for the particular vehicle.

In some implementations, the vehicle information platform may receive, from the user device, information indicating that the user does not wish to be disturbed by a representative of the vehicle dealership lot, and may provide, to another user device associated with the representative, a notification indicating that the user does not wish to be disturbed by the representative. In some implementations, the vehicle information platform may provide, to the user device, a vehicle information application, where the user device provides the data identifying the user and the data identifying the particular vehicle via the vehicle information application.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing machine learning to generate vehicle information for a vehicle captured by a user device in a vehicle lot. In some implementations, one or more process blocks of FIG. 6 may be performed by a vehicle information platform (e.g., vehicle information platform 220). In some implementations, one or more process blocks of FIG. 6 may be performed by another device or a group of devices separate from or including the vehicle information platform, such as a user device (e.g., user device 210).

As shown in FIG. 6, process 600 may include receiving vehicle data associated with vehicles located at a vehicle dealership lot (block 610). For example, the vehicle information platform (e.g., using computing resource 224, processor 320, communication interface 370, and/or the like) may receive vehicle data associated with vehicles located at a vehicle dealership lot, as described above in connection with FIGS. 1A-2.

As further shown in FIG. 6, process 600 may include receiving, from a user device, data identifying a user of the user device and data identifying a particular vehicle of the vehicles, wherein the data identifying the user includes profile data of the user, and wherein the user device provides the data identifying the user and the data identifying the particular vehicle when the user device communicates with a wireless communication device associated with the particular vehicle (block 620). For example, the vehicle information platform (e.g., using computing resource 224, processor 320, communication interface 370, and/or the like) may receive, from a user device, data identifying a user of the user device and data identifying a particular vehicle of the vehicles, as described above in connection with FIGS. 1A-2. In some implementations, the data identifying the user may include profile data of the user, and the user device may provide the data identifying the user and the data identifying the particular vehicle when the user device communicates with a wireless communication device associated with the particular vehicle.

As further shown in FIG. 6, process 600 may include comparing the data identifying the particular vehicle and the vehicle data to determine particular vehicle data associated with the particular vehicle (block 630). For example, the vehicle information platform (e.g., using computing resource 224, processor 320, memory 330, and/or the like) may compare the data identifying the particular vehicle and the vehicle data to determine particular vehicle data associated with the particular vehicle, as described above in connection with FIGS. 1A-2.

As further shown in FIG. 6, process 600 may include processing the particular vehicle data and the profile data of the user, with a first model, to determine purchase options for the particular vehicle and the user (block 640). For example, the vehicle information platform (e.g., using computing resource 224, processor 320, storage component 340, and/or the like) may process the particular vehicle data and the profile data of the user, with a first model, to determine purchase options for the particular vehicle and the user, as described above in connection with FIGS. 1A-2.

As further shown in FIG. 6, process 600 may include providing, to the user device, the particular vehicle data and the purchase options for the particular vehicle to cause the user device to display the particular vehicle data and the purchase options for the particular vehicle (block 650). For example, the vehicle information platform (e.g., using computing resource 224, processor 320, communication interface 370, and/or the like) may provide, to the user device, the particular vehicle data and the purchase options for the particular vehicle to cause the user device to display the particular vehicle data and the purchase options for the particular vehicle, as described above in connection with FIGS. 1A-2.

As further shown in FIG. 6, process 600 may include receiving, from the user device, presence data indicating a presence of the user device at the particular vehicle, wherein the user device provides the presence data to the device when the user device communicates with the wireless communication device associated with the particular vehicle (block 660). For example, the vehicle information platform (e.g., using computing resource 224, processor 320, communication interface 370, and/or the like) may receive, from the user device, presence data indicating a presence of the user device at the particular vehicle, as described above in connection with FIGS. 1A-2. In some implementations, the user device may provide the presence data to the device when the user device communicates with the wireless communication device associated with the particular vehicle.

As further shown in FIG. 6, process 600 may include receiving other presence data associated with other user devices previously and/or currently present at the vehicle dealership lot, wherein the other user devices are associated with other users, and wherein the other users are associated with other profile data (block 670). For example, the vehicle information platform (e.g., using computing resource 224, processor 320, communication interface 370, and/or the like) may receive other presence data associated with other user devices previously and/or currently present at the vehicle dealership lot, as described above in connection with FIGS. 1A-2. In some implementations, the other user devices may be associated with other users, and the other users may be associated with other profile data.

As further shown in FIG. 6, process 600 may include processing the presence data, the other presence data, the vehicle data, the profile data, and the other profile data, with a second model, to generate trend data associated with the vehicles located at the vehicle dealership lot (block 680). For example, the vehicle information platform (e.g., using computing resource 224, processor 320, memory 330, and/or the like) may process the presence data, the other presence data, the vehicle data, the profile data, and the other profile data, with a second model, to generate trend data associated with the vehicles located at the vehicle dealership lot, as described above in connection with FIGS. 1A-2.

As further shown in FIG. 6, process 600 may include performing one or more actions based on the trend data associated with the vehicles located at the vehicle dealership lot (block 690). For example, the vehicle information platform (e.g., using computing resource 224, processor 320, storage component 340, communication interface 370, and/or the like) may perform one or more actions based on the trend data associated with the vehicles located at the vehicle dealership lot, as described above in connection with FIGS. 1A-2.

Process 600 may include additional implementations, such as any single implementation or any combination of implementations described below and/or described with regard to any other process described herein.

In some implementations, the vehicle information platform may process the presence data and the other presence data, with a third model, to generate a heat map for the vehicles located at the vehicle dealership lot, where the heat map provides an indication of levels of interest in the vehicles located at the vehicle dealership lot; and may provide the heat map to the user device and/or to another user device associated with a representative of the vehicle dealership lot.

In some implementations, when performing the one or more actions, the vehicle information platform may cause a price of the particular vehicle to be adjusted, may cause the particular vehicle to be manually moved to a different location of the vehicle dealership lot, may instruct the particular vehicle to autonomously move to the different location of the vehicle dealership lot, and/or may cause a promotion to be generated for the particular vehicle.

In some implementations, when performing the one or more actions, the vehicle information platform may cause a promotion to be generated for the user for the particular vehicle, may order additional quantities of the particular vehicle for the vehicle dealership lot, may cause the particular vehicle to be removed from the vehicle dealership lot, and/or may cause a sale of the particular vehicle to be completed for user. In some implementations, the purchase options for the particular vehicle and the user may include data indicating multiple pre-approved monthly payment options for the particular vehicle, and a bluebook value of the particular vehicle.

In some implementations, the vehicle information platform may receive, from the user device, information indicating that the user wishes to speak to a representative of the vehicle dealership lot about the particular vehicle, and may provide, to another user device associated with the representative, a notification indicating that the user wishes to speak to the representative about the particular vehicle, where the notification includes the particular vehicle data and the profile data of the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a device, vehicle data associated with vehicles located at a vehicle dealership lot;
  receiving, by the device and from a user device, data identifying a user of the user device, data identifying a particular vehicle of the vehicles, and presence data indicating a presence of the user device proximate to the particular vehicle for at least a threshold period of time,
    wherein the data identifying the user includes profile data of the user, and
    wherein the user device provides the data identifying the user and the data identifying the particular vehicle when the user device communicates with a wireless communication device associated with the particular vehicle;
  comparing, by the device, the data identifying the particular vehicle and the vehicle data to determine particular vehicle data associated with the particular vehicle,
    wherein the particular vehicle data includes data identifying one or more of:
      a make of the particular vehicle,
      a model of the particular vehicle,
      a year of the particular vehicle,
      a quantity of time that the particular vehicle has been located at the vehicle dealership lot,
      a level of interest in the particular vehicle, or
      a price of the particular vehicle;
  processing, by the device, the particular vehicle data and the profile data of the user, with a first model, to determine purchase options for the particular vehicle and the user;

providing, by the device and to the user device, the particular vehicle data and the purchase options for the particular vehicle to cause the user device to display the particular vehicle data and the purchase options for the particular vehicle;

receiving, by the device, other presence data associated with other user devices previously and/or currently present at the vehicle dealership lot,
  wherein the other presence data indicates a presence of the other user devices proximate to the particular vehicle for at least the threshold period of time,
  wherein the other user devices are associated with other users, and
  wherein the other users are associated with other profile data;

processing, by the device, the presence data, the other presence data, the vehicle data, the profile data, and the other profile data, with a second model to generate trend data associated with the vehicles located at the vehicle dealership lot; and performing, by the device, one or more actions based on the trend data associated with the vehicles located at the vehicle dealership lot.

2. The method of claim 1,
wherein the user device provides the presence data to the device when the user device communicates with the wireless communication device associated with the particular vehicle;

processing the presence data and other presence data associated with other user devices previously and/or currently present at the vehicle dealership lot, with a third model, to generate a heat map for the vehicles located at the vehicle dealership lot,
  wherein the heat map provides an indication of levels of interest in the vehicles located at the vehicle dealership lot; and providing the heat map to at least one of the user device and to another user device associated with a representative of the vehicle dealership lot.

3. The method of claim 1,
wherein the user device provides the presence data to the device when the user device communicates with the wireless communication device associated with the particular vehicle.

4. The method of claim 3, wherein performing the one or more actions includes one or more of:
  causing the price of the particular vehicle to be adjusted;
  causing the particular vehicle to be manually moved to a different location of the vehicle dealership lot;
  instructing the particular vehicle to autonomously move to the different location of the vehicle dealership lot; or
  causing a promotion to be generated for the particular vehicle.

5. The method of claim 3, wherein performing the one or more actions includes one or more of:
  causing a promotion to be generated for the user for the particular vehicle;
  ordering additional quantities of the particular vehicle for the vehicle dealership lot;
  causing the particular vehicle to be removed from the vehicle dealership lot; or
  causing a sale of the particular vehicle to be completed for user.

6. The method of claim 1, wherein the purchase options for the particular vehicle and the user includes data indicating:
  multiple pre-approved monthly payment options for the particular vehicle, and
  a value of the particular vehicle.

7. The method of claim 1, further comprising:
receiving, from the user device, information indicating that the user wishes to speak to a representative of the vehicle dealership lot about the particular vehicle; and
providing, to another user device associated with the representative, a notification indicating that the user wishes to speak to the representative about the particular vehicle,
  wherein the notification includes the particular vehicle data.

8. A device, comprising:
one or more memories; and
one or more processors, communicatively coupled to the one or more memories, configured to:
  receive vehicle data associated with vehicles located at a vehicle dealership lot;
  receive, from a user device, data identifying a user of the user device, data identifying a particular vehicle of the vehicles, and presence data indicating a presence of the user device proximate to the particular vehicle for at least a threshold period of time,
    wherein the data identifying the user includes profile data of the user, and
    wherein the user device provides the data identifying the user, the data identifying the particular vehicle, and the presence data when the user device communicates with a wireless communication device associated with the particular vehicle;
  compare the data identifying the particular vehicle and the vehicle data to determine particular vehicle data associated with the particular vehicle;
  process the particular vehicle data and the profile data of the user, with a first model, to determine purchase options for the particular vehicle and the user;
  provide, to the user device, the particular vehicle data and the purchase options for the particular vehicle to cause the user device to display the particular vehicle data and the purchase options for the particular vehicle;
  receive other presence data associated with other user devices previously and/or currently present at the vehicle dealership lot,
    wherein the other presence data indicates a presence of the other user devices proximate to the particular vehicle for at least the threshold period of time,
    wherein the other user devices are associated with other users, and
    wherein the other users are associated with other profile data;
  process the presence data, the other presence data, the vehicle data, the profile data, and the other profile data, with a second model to generate trend data associated with the vehicles located at the vehicle dealership lot;
  perform one or more actions based on the trend data associated with the vehicles located at the vehicle dealership lot;
  process the presence data and other presence data associated with other user devices previously and/or currently present at the vehicle dealership lot, with a third model, to generate a heat map for the vehicles located at the vehicle dealership lot,
    wherein the heat map provides an indication of levels of interest in the vehicles located at the vehicle dealership lot; and provide the heat map to another user device associated with a representative of the vehicle dealership lot.

9. The device of claim 8, wherein the one or more processors are further configured to:
utilize the data identifying the particular vehicle to validate or update inventory data associated with the particular vehicle.

10. The device of claim 8, wherein, when performing the one or more actions, the one or more processors are configured to one or more of:
cause a price of the particular vehicle to be adjusted;
cause the particular vehicle to be manually moved to a different location of the vehicle dealership lot;
instruct the particular vehicle to autonomously move to the different location of the vehicle dealership lot;
cause a promotion to be generated for the particular vehicle;
cause a promotion to be generated for the user for the particular vehicle;
order additional quantities of the particular vehicle for the vehicle dealership lot;
cause the particular vehicle to be removed from the vehicle dealership lot; or
cause a sale of the particular vehicle to be completed for user.

11. The device of claim 8, wherein the particular vehicle data includes data identifying one or more of:
a make of the particular vehicle,
a model of the particular vehicle,
a year of the particular vehicle,
a mileage of the particular vehicle,
a quantity of time that the particular vehicle has been located at the vehicle dealership lot,
a price of the particular vehicle,
a level of interest in the particular vehicle, or
a vehicle history report for the particular vehicle.

12. The device of claim 8, wherein the one or more processors are further configured to:
receive, from the user device, information indicating that the user does not wish to be disturbed by a representative of the vehicle dealership lot; and
provide, to another user device associated with the representative, a notification indicating that the user does not wish to be disturbed by the representative.

13. The device of claim 8, wherein the one or more processors are further configured to:
provide, to the user device, a vehicle information application,
wherein the user device provides the data identifying the user and the data identifying the particular vehicle via the vehicle information application.

14. The device of claim 8, wherein the wireless communication device associated with the particular vehicle comprises at least one or more:
near-field communication (NFC) devices,
Bluetooth devices, or
infrared devices.

15. A non-transitory computer-readable medium storing instructions, the instructions comprising:
one or more instructions that, when executed by one or more processors of a device, cause the one or more processors to:
receive vehicle data associated with vehicles located at a vehicle dealership lot;
receive, from a user device, data identifying a user of the user device, data identifying a particular vehicle of the vehicles, and presence data indicating a presence of the user device proximate to the particular vehicle for at least a threshold period of time,
wherein the data identifying the user includes profile data of the user, and
wherein the user device provides the data identifying the user, the data identifying the particular vehicle, and the presence data when the user device communicates with a wireless communication device associated with the particular vehicle;
compare the data identifying the particular vehicle and the vehicle data to determine particular vehicle data associated with the particular vehicle;
process the particular vehicle data and the profile data of the user, with a first model, to determine purchase options for the particular vehicle and the user;
provide, to the user device, the particular vehicle data and the purchase options for the particular vehicle to cause the user device to display the particular vehicle data and the purchase options for the particular vehicle;
receive other presence data associated with other user devices previously and/or currently present at the vehicle dealership lot,
wherein the other presence data indicates a presence of the other user devices proximate to the particular vehicle for at least the threshold period of time, and
wherein the other user devices are associated with other users,
wherein the other users are associated with other profile data;
process the presence data, the other presence data, the vehicle data, the profile data, and the other profile data, with a second model, to generate trend data associated with the vehicles located at the vehicle dealership lot; and
perform one or more actions based on the trend data associated with the vehicles located at the vehicle dealership lot.

16. The non-transitory computer-readable medium of claim 15, wherein the instructions further comprise:
one or more instructions that, when executed by the one or more processors, cause the one or more processors to:
process the presence data and the other presence data, with a third model, to generate a heat map for the vehicles located at the vehicle dealership lot,
wherein the heat map provides an indication of levels of interest in the vehicles located at the vehicle dealership lot; and
provide the heat map to the user device and/or to another user device associated with a representative of the vehicle dealership lot.

17. The non-transitory computer-readable medium of claim 15, wherein the one or more instructions, that cause the one or more processors to perform the one or more actions, cause the one or more processors to one or more of:
cause a price of the particular vehicle to be adjusted;
cause the particular vehicle to be manually moved to a different location of the vehicle dealership lot;
instruct the particular vehicle to autonomously move to the different location of the vehicle dealership lot; or
cause a promotion to be generated for the particular vehicle.

18. The non-transitory computer-readable medium of claim 15, wherein the one or more instructions, that cause the one or more processors to perform the one or more actions, cause the one or more processors to one or more of:
- cause a promotion to be generated for the user for the particular vehicle;
- order additional quantities of the particular vehicle for the vehicle dealership lot;
- cause the particular vehicle to be removed from the vehicle dealership lot; or
- cause a sale of the particular vehicle to be completed for user.

19. The non-transitory computer-readable medium of claim 15, wherein the purchase options for the particular vehicle and the user includes data indicating:
- multiple pre-approved monthly payment options for the particular vehicle, and
- a bluebook value of the particular vehicle.

20. The non-transitory computer-readable medium of claim 15, wherein the instructions further comprise:
- one or more instructions that, when executed by the one or more processors, cause the one or more processors to:
  - receive, from the user device, information indicating that the user wishes to speak to a representative of the vehicle dealership lot about the particular vehicle; and
  - provide, to another user device associated with the representative, a notification indicating that the user wishes to speak to the representative about the particular vehicle,
    - wherein the notification includes the particular vehicle data and the profile data of the user.

\* \* \* \* \*